United States Patent
Sengupta et al.

(10) Patent No.: US 12,074,708 B2
(45) Date of Patent: Aug. 27, 2024

(54) GROUP FEEDBACK FOR MULTICAST COMMUNICATIONS

(71) Applicant: QUALCOMM Incorporated, San Diego, CA (US)

(72) Inventors: Ayan Sengupta, San Diego, CA (US); Alberto Rico Alvarino, San Diego, CA (US); Le Liu, Fremont, CA (US); Kazuki Takeda, Tokyo (JP); Peter Gaal, San Diego, CA (US); Tao Luo, San Diego, CA (US); Wanshi Chen, San Diego, CA (US); Xiaoxia Zhang, San Diego, CA (US); Juan Montojo, San Diego, CA (US); Umesh Phuyal, San Diego, CA (US); Prasad Reddy Kadiri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 545 days.

(21) Appl. No.: 17/342,023

(22) Filed: Jun. 8, 2021

(65) Prior Publication Data
US 2021/0399833 A1 Dec. 23, 2021

Related U.S. Application Data

(60) Provisional application No. 63/041,221, filed on Jun. 19, 2020.

(51) Int. Cl.
*H04L 1/1607* (2023.01)
*H04L 5/00* (2006.01)
(Continued)

(52) U.S. Cl.
CPC .......... *H04L 1/1621* (2013.01); *H04L 5/0055* (2013.01); *H04L 27/2605* (2013.01);
(Continued)

(58) Field of Classification Search
None
See application file for complete search history.

(56) References Cited

U.S. PATENT DOCUMENTS

2007/0153672 A1* 7/2007 Terry ................ H04L 1/0025
370/252
2009/0196362 A1* 8/2009 Song ................ H04L 5/0032
375/260
(Continued)

FOREIGN PATENT DOCUMENTS

EP 2187549 A1 5/2010
WO WO-2017035727 A1 3/2017
WO WO-2017171616 A1 10/2017

OTHER PUBLICATIONS

International Search Report and Written Opinion—PCT/US2021/036565—ISA/EPO—Oct. 4, 2021.

*Primary Examiner* — Alpus Hsu
*Assistant Examiner* — Camquyen Thai
(74) *Attorney, Agent, or Firm* — Kevin M. Donnelly; Holland & Hart LLP

(57) ABSTRACT

Methods, systems, and devices for wireless communication are described. Generally, the described techniques provide for efficiently facilitating acknowledgment (ACK) or negative acknowledgment (NACK) feedback from a user equipment (UE) for a set of transport blocks in one or more multicast transmissions from a base station. The UE may determine control channel resources for transmitting the ACK/NACK feedback, and each respective control channel resource may correspond to a distinct subset of the set of transport blocks. Once the UE determines a subset of transport blocks that the UE failed to decode (such as at least one transport block), the UE may determine a respective control channel resource that corresponds to the at least one transport block that the UE failed to decode. The UE may
(Continued)

transmit ACK/NACK feedback on the respective control channel resource, which, in some examples, may indicate that the UE failed to decode the subset of transport blocks.

30 Claims, 16 Drawing Sheets

(51) Int. Cl.
*H04L 27/26* (2006.01)
*H04W 4/06* (2009.01)
*H04W 72/044* (2023.01)
*H04W 72/20* (2023.01)

(52) U.S. Cl.
CPC .......... *H04L 27/2614* (2013.01); *H04W 4/06* (2013.01); *H04W 72/20* (2023.01); *H04W 72/044* (2013.01)

(56) References Cited

U.S. PATENT DOCUMENTS

| | | | |
|---|---|---|---|
| 2011/0305134 A1* | 12/2011 | Chung | H04L 1/1854 370/216 |
| 2012/0300727 A1* | 11/2012 | Kim | H04W 52/248 370/329 |
| 2014/0016497 A1* | 1/2014 | Seo | H04W 72/1273 370/252 |
| 2016/0234000 A1* | 8/2016 | Lee | H04L 5/22 |
| 2018/0097587 A1* | 4/2018 | Seo | H04L 5/0055 |
| 2018/0368117 A1* | 12/2018 | Ying | H04L 1/0061 |
| 2018/0368137 A1* | 12/2018 | Yin | H04L 5/0091 |
| 2019/0150122 A1* | 5/2019 | Ying | H04W 72/23 370/329 |
| 2019/0306841 A1* | 10/2019 | Huang | H04L 5/0055 |
| 2019/0372696 A1* | 12/2019 | Park | H04J 11/0076 |
| 2020/0099480 A1* | 3/2020 | Grövlen | H04L 1/1822 |
| 2020/0163023 A1* | 5/2020 | Pelletier | H04W 52/38 |
| 2021/0243782 A1* | 8/2021 | Miao | H04L 5/0091 |

* cited by examiner

| 205 ⌇ ☐ | First region |
|---|---|
| 210 ⌇ ▨ | Second region |
| 215 ⌇ ▨ | Third region |
| 220 ⌇ ▨ | Fourth region |

⬑ 200

GROUP FEEDBACK FOR MULTICAST COMMUNICATIONS

CROSS REFERENCE

The present application for patent claims the benefit of U.S. Provisional Patent Application No. 63/041,221 by Sengupta et al., entitled "GROUP FEEDBACK FOR MULTICAST COMMUNICATIONS," filed Jun. 19, 2020, assigned to the assignee hereof, and expressly incorporated by reference herein.

TECHNICAL FIELD

The following relates generally to wireless communications and more specifically to group feedback for multicast communications.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a quantity of base stations or network access nodes, each simultaneously supporting communication for multiple communication devices, which may be otherwise known as user equipments (UEs). In some wireless communications systems, a base station may broadcast or multicast data to one or more UEs and the one or more UEs may monitor for the data from the base station. If a UE fails to decode the data, the UE may report feedback to the base station to trigger a retransmission of the data from the base station.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication. The method includes monitoring for a set of transport blocks transmitted from a base station in a multicast transmission, the set of transport blocks including a subset of transport blocks and a second subset of transport blocks, the subset of transport blocks and the second subset of transport blocks each including two or more transport blocks and each being associated with a respective control channel resource of a set of control channel resources, determining that the UE failed to decode at least one transport block of the subset of the set of transport blocks, determining the respective control channel resource associated with the subset of transport blocks on which to transmit feedback to the base station based on the subset of the set of transport blocks that the UE failed to decode, and transmitting the feedback to the base station on the respective control channel resource associated with the subset of transport blocks.

Another innovative aspect of the subject matter described in this disclosure can be implemented in an apparatus for wireless communication at a UE. The apparatus may include a processor, memory coupled with the processor, and instructions stored in the memory. The instructions may be executable by the processor to cause the apparatus to monitor for a set of transport blocks transmitted from a base station in a multicast transmission, the set of transport blocks including a subset of transport blocks and a second subset of transport blocks, the subset of transport blocks and the second subset of transport blocks each including two or more transport blocks and each being associated with a respective control channel resource of a set of control channel resources, determine that the UE failed to decode at least one transport block of the subset of the set of transport blocks, determine the respective control channel resource associated with the subset of transport blocks on which to transmit feedback to the base station based on the subset of the set of transport blocks that the UE failed to decode, and transmit the feedback to the base station on the respective control channel resource associated with the subset of transport blocks.

Another innovative aspect of the subject matter described in this disclosure can be implemented in an apparatus for wireless communication at a UE. The apparatus may include means for monitoring for a set of transport blocks transmitted from a base station in a multicast transmission, the set of transport blocks including a subset of transport blocks and a second subset of transport blocks, the subset of transport blocks and the second subset of transport blocks each including two or more transport blocks and each being associated with a respective control channel resource of a set of control channel resources, means for determining that the UE failed to decode at least one transport block of the subset of the set of transport blocks, means for determining the respective control channel resource associated with the subset of transport blocks on which to transmit feedback to the base station based on the subset of the set of transport blocks that the UE failed to decode, and means for transmitting the feedback to the base station on the respective control channel resource associated with the subset of transport blocks.

Another innovative aspect of the subject matter described in this disclosure can be implemented in a non-transitory computer-readable medium storing code for wireless communication at a UE. The code may include instructions executable by a processor to monitor for a set of transport blocks transmitted from a base station in a multicast transmission, the set of transport blocks including a subset of transport blocks and a second subset of transport blocks, the subset of transport blocks and the second subset of transport blocks each including two or more transport blocks and each being associated with a respective control channel resource of a set of control channel resources, determine that the UE failed to decode at least one transport block of the subset of the set of transport blocks, determine the respective control channel resource associated with the subset of transport blocks on which to transmit feedback to the base station based on the subset of the set of transport blocks that the UE failed to decode, and transmit the feedback to the base station on the respective control channel resource associated with the subset of transport blocks.

Another innovative aspect of the subject matter described in this disclosure can be implemented in a method of wireless communication at a base station. The method may include transmitting a set of transport blocks in a first multicast transmission, the set of transport blocks including a subset of transport blocks and a second subset of transport blocks, the subset of transport blocks and the second subset of transport blocks each including two or more transport blocks and each being associated with a respective control channel resource of a set of control channel resources, receiving, from a user equipment (UE) based on the first multicast transmission, feedback on the respective control channel resource associated with the subset of transport blocks, determining that the control channel resource associated with the subset of transport blocks indicates that the UE failed to decode at least one transport block of the subset of the set of transport blocks, and retransmitting the subset of the set of transport blocks in a second multicast transmission based on the determining.

Another innovative aspect of the subject matter described in this disclosure can be implemented in an apparatus for wireless communication at a base station. The apparatus may include a processor, memory coupled with the processor, and instructions stored in the memory. The instructions may be executable by the processor to cause the apparatus to transmit a set of transport blocks in a first multicast transmission, the set of transport blocks including a subset of transport blocks and a second subset of transport blocks, the subset of transport blocks and the second subset of transport blocks each including two or more transport blocks and each being associated with a respective control channel resource of a set of control channel resources, receive, from a user equipment (UE) based on the first multicast transmission, feedback on the respective control channel resource associated with the subset of transport blocks, determine that the control channel resource associated with the subset of transport blocks indicates that the UE failed to decode at least one transport block of the subset of the set of transport blocks, and retransmit the subset of the set of transport blocks in a second multicast transmission based on the determining.

Another innovative aspect of the subject matter described in this disclosure can be implemented in an apparatus for wireless communication at a base station. The apparatus may include means for transmitting a set of transport blocks in a first multicast transmission, the set of transport blocks including a subset of transport blocks and a second subset of transport blocks, the subset of transport blocks and the second subset of transport blocks each including two or more transport blocks and each being associated with a respective control channel resource of a set of control channel resources, means for receiving, from a user equipment (UE) based on the first multicast transmission, feedback on the respective control channel resource associated with the subset of transport blocks, means for determining that the control channel resource associated with the subset of transport blocks indicates that the UE failed to decode at least one transport block of the subset of the set of transport blocks, and means for retransmitting the subset of the set of transport blocks in a second multicast transmission based on the determining.

Another innovative aspect of the subject matter described in this disclosure can be implemented in a non-transitory computer-readable medium storing code for wireless communication at a base station is described. The code may include instructions executable by a processor to transmit a set of transport blocks in a first multicast transmission, the set of transport blocks including a subset of transport blocks and a second subset of transport blocks, the subset of transport blocks and the second subset of transport blocks each including two or more transport blocks and each being associated with a respective control channel resource of a set of control channel resources, receive, from a user equipment (UE) based on the first multicast transmission, feedback on the respective control channel resource associated with the subset of transport blocks, determine that the control channel resource associated with the subset of transport blocks indicates that the UE failed to decode at least one transport block of the subset of the set of transport blocks, and retransmit the subset of the set of transport blocks in a second multicast transmission based on the determining.

DETAILED DESCRIPTION

Figure 1:
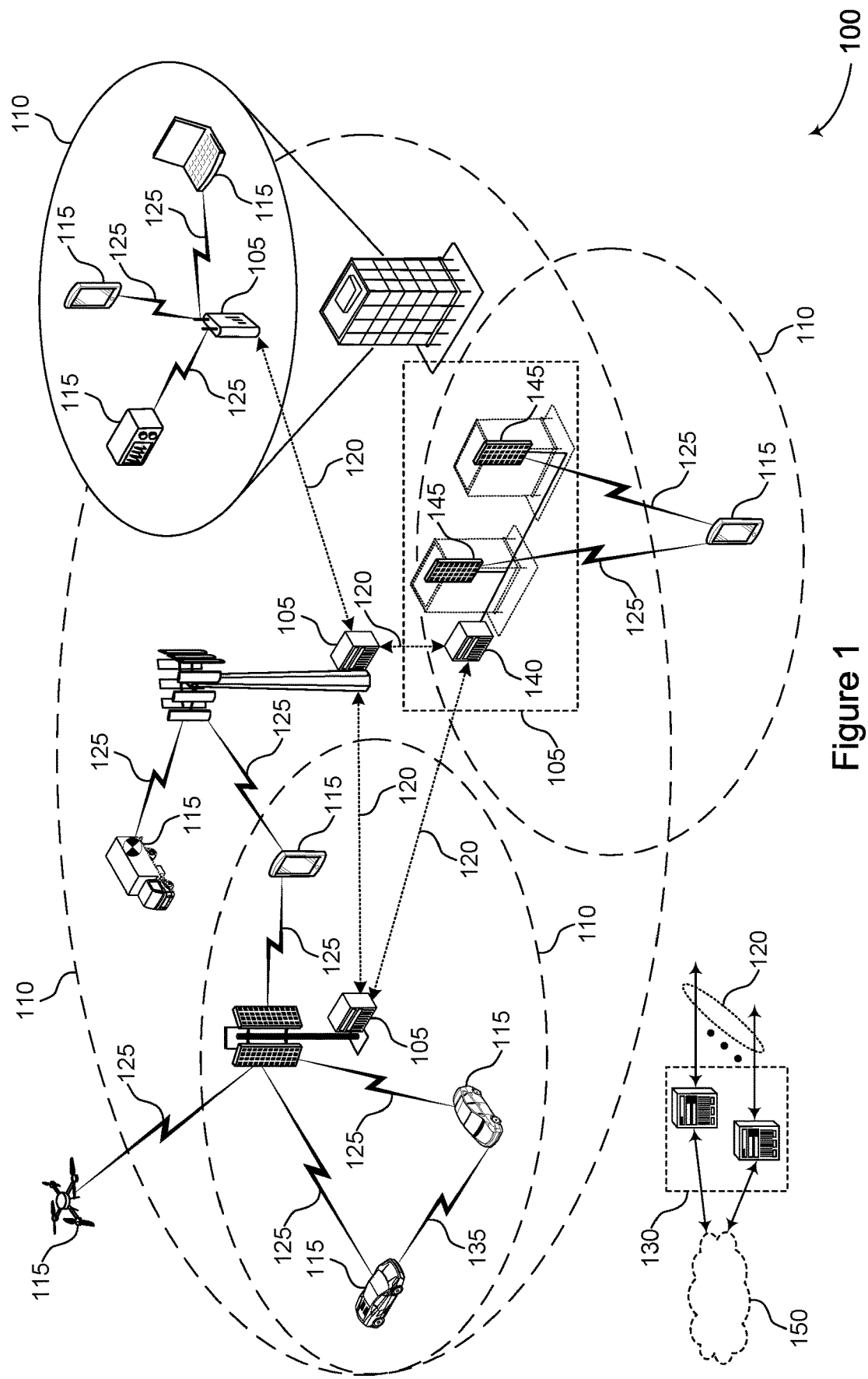
FIG. 1 illustrates an example of a wireless communications system that supports group feedback for multicast communications in accordance with aspects of the present disclosure.

In some wireless communications systems, a base station may multicast or broadcast data in the form of transport blocks to one or more user equipments (UEs). In some implementations, the base station may multicast or broadcast a set of transport blocks to the one or more UEs. In some examples, the set of transport blocks may include two or more subsets of transport blocks, and each subset of the transport blocks may each include two or more transport blocks and may each be associated with a respective control channel resource of a set of control channel resources. Some UEs may successfully decode all transport blocks in the set, and other UEs may fail to decode one or more of the transport blocks in the set (for example, at least one transport block of at least one subset of the set of transport blocks). If a UE fails to decode the one or more of the transport blocks, it may be appropriate for the UE to transmit feedback, such as a negative acknowledgment (NACK), to the base station to trigger a retransmission of the one or more transport blocks. To limit overhead, multiple UEs may share resources for transmitting feedback, for example, for each transport block. For example, if multiple UEs fail to decode the same transport block in the set of transport blocks, the UEs may transmit feedback, such as a NACK, on a same resource. In some examples, however, if a UE is configured to transmit feedback for each transport block, and the quantity of transport blocks that the UE fails to decode is relatively high, the overhead of transmitting the feedback may relatedly be relatively high. The overhead may be further increased if multiple UEs are configured to transmit feedback for each transport block.

Various aspects described herein generally relate to wireless communications, and more specifically, to techniques for facilitating feedback from a UE for a set of transport blocks in one or more multicast transmissions from a base station. The UE may monitor for the set of transport blocks from the base station, and the UE may attempt to receive and decode the transport blocks. The UE may also determine control channel resources allocated for transmitting feedback for the set of transport blocks, and each respective control channel resource may correspond to a distinct subset of the set of transport blocks. If the UE fails to decode at least one transport block of a subset of the set of transport blocks, the UE may determine a respective control channel resource that corresponds to the subset of transport blocks that the UE failed to decode. The UE may then transmit feedback on the respective control channel resource, which, in some examples, may indicate that the UE failed to decode the at least one transport block of the subset of transport blocks. In some other examples, the feedback may also indicate that the UE successfully decoded another subset of the transport blocks. The base station may receive the feedback or detect energy on the control channel resources and determine that at least one UE failed to decode the at least one transport block of the subset of transport blocks. In some examples, the base station may then retransmit at least the subset of transport blocks that including the at least one transport block of the at least one UE failed to decode. For instance, the base station may retransmit the subset of transport blocks that the at least one UE failed to decode in addition to other transport blocks that other UEs failed to decode.

Particular aspects of the subject matter described in this disclosure may be implemented to realize one or more potential advantages. For example, operations performed by the described communication devices may provide improvements to feedback procedures for multicast transmissions by limiting overhead and facilitating clear signaling. In some implementations, instead of transmitting feedback for each transport block, a UE may transmit feedback indicating at least one transport block of a subset of transport blocks that the UE failed to decode. As a result, the overhead of transmitting feedback for multicast transmissions may be reduced. In some implementations, because each (respective) control channel resource allocated to a UE may correspond to a different subset of transport blocks, the UE may be able to clearly indicate at least one transport block of the subset of transport blocks that the UE failed to decode (for example, while still sharing resources with other UEs).

Aspects of the disclosure introduced above are described below in the context of a wireless communications system. Examples of processes and signaling exchanges that support group feedback for multicast communications are then described. Aspects of the disclosure are further illustrated by and described with reference to apparatus diagrams, system diagrams, and flowcharts that relate to group feedback for multicast communications.

FIG. 1 illustrates an example of a wireless communications system 100 that supports group feedback for multicast communications in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105 (for example, in a physical uplink shared channel (PUSCH) or a physical uplink control channel (PUCCH)), or downlink transmissions from a base station 105 to a UE 115 (for example, in a physical downlink shared channel (PDSCH) or a physical downlink control channel (PDCCH)). Carriers may carry downlink or uplink communications (for example, in an FDD mode) or may be configured to carry downlink and uplink communications (for example, in a TDD mode).

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, in which the symbol period and subcarrier spacing are inversely related. The number of bits carried by each resource element may depend on the modulation scheme (for example, the order of the modulation scheme, the coding rate of the modulation scheme, or both). The more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

The time intervals for the base stations 105 or the UEs 115 may be expressed in multiples of a basic time unit, which may, for example, refer to a sampling period of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and may provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. If operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ feedback may include an ACK indicating that a transmission is successfully received and decoded or a NACK indicating that a UE 115 failed to receive or decode a transmission. HARQ may include a combination of error detection (for example, using a cyclic redundancy check (CRC)), forward error correction (FEC), and retransmission (for example, automatic repeat request (ARQ)). HARQ may improve throughput at a Medium Access Control (MAC) layer in poor radio conditions (for example, low signal-to-noise conditions). In some examples, a device may support same-slot HARQ feedback, in which the device may provide HARQ feedback in a specific slot for data received in a previous symbol in the slot. In other cases, the device may provide HARQ feedback in a subsequent slot, or according to some other time interval.

In wireless communications system 100, the base station 105 may multicast or broadcast data in the form of transport blocks to one or more UEs 115. In some implementations, the base station 105 may multicast or broadcast a set of transport blocks to the one or more UEs 115. Some UEs 115 may successfully decode all transport blocks in the set, and other UEs 115 may fail to decode one or more of the transport blocks in the set. If a UE 115 fails to decode one or more of the transport blocks, it may be appropriate for the UE 115 to transmit feedback, such as a NACK, to the base station 105 to trigger a retransmission of the one or more transport blocks. That is, uplink UE feedback may provide base stations 105 with some indication of failing spatial signatures in a network (for example, the transport blocks that a UE 115 failed to decode), and the base station 105 may tailor retransmissions according to such failing spatial signatures. In some aspects, the feedback of the UE 115 may be NACK-based (for example, may include NACKs indicating that the UE 115 failed to receive or decode a transmission) or ACK/NACK-based (for example, including both ACKs and NACKs indicating whether a UE failed to receive or decode a transmission or did receive and decode a transmission).

Figure 2:
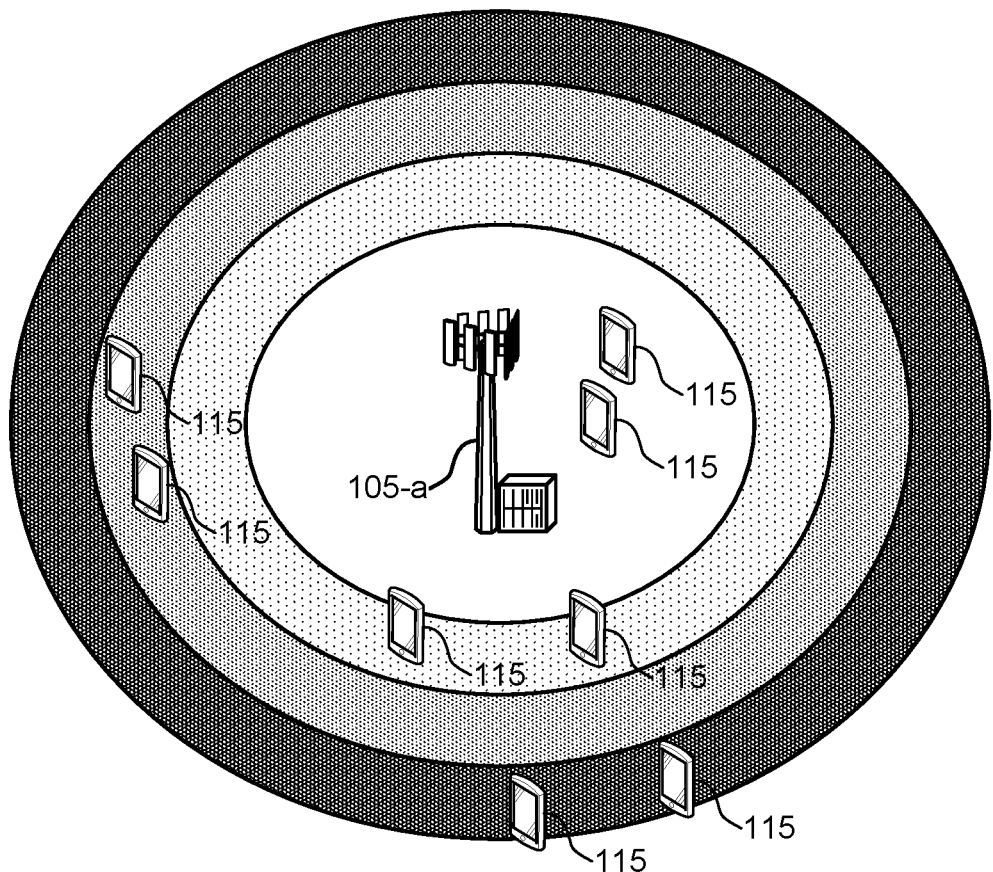
FIG. 2 illustrates an example of a coverage area of a base station in accordance with aspects of the present disclosure.

FIG. 2 illustrates an example of a coverage area 200 of a base station 105-a in accordance with aspects of the present disclosure. Multiple UEs 115 may be within the coverage area 200, but some UEs 115 may be closer to the base station 105-a than other UEs 115. For instance, UEs 115 in a first region 205 may be closer to the base station 105-a than UEs 115 in the second region 210, the UEs 115 in the second region 210 may be closer to the base station 105-a than UEs 115 in the third region 215, and the UEs 115 in the third region 215 may be closer to the base station 105-a than UEs 115 in the fourth region 220. In some implementations, if the base station 105-a transmits multiple transport blocks in a multicast transmission to the UEs 115 in the coverage area 200 of the base station 105-a, the UEs 115 in the fourth region 220 may be more likely to fail to decode more transport blocks than the UEs 115 in the first region 205. Specifically, UEs 115 experiencing worse coverage may be more likely to fail to receive and decode transport blocks than UEs 115 experiencing better coverage, and it may be appropriate to allocate more resources to the UEs 115 experiencing worse coverage to facilitate NACK feedback from these UEs 115 to the base station 105-a.

In some aspects, the wireless communications system 100 may allocate resources to one or more UEs 115 based on a channel metric. The channel metric may, in some examples, correspond to the quality of coverage experienced by a UE 115. Examples of the channel metric may be a reference signal received power (RSRP), a received signal strength indicator (RSSI), a beamformed angle-of-arrival, a beamformed angle-of-departure, a transmit beam, a receive beam, or a geographical location. The wireless communications system 100 may, in some examples, allocate more resources to UEs 115 with a worse channel metric (for example, lower RSRP) and fewer resources to UEs 115 with a better channel metric (for example, higher RSRP).

Figure 3:
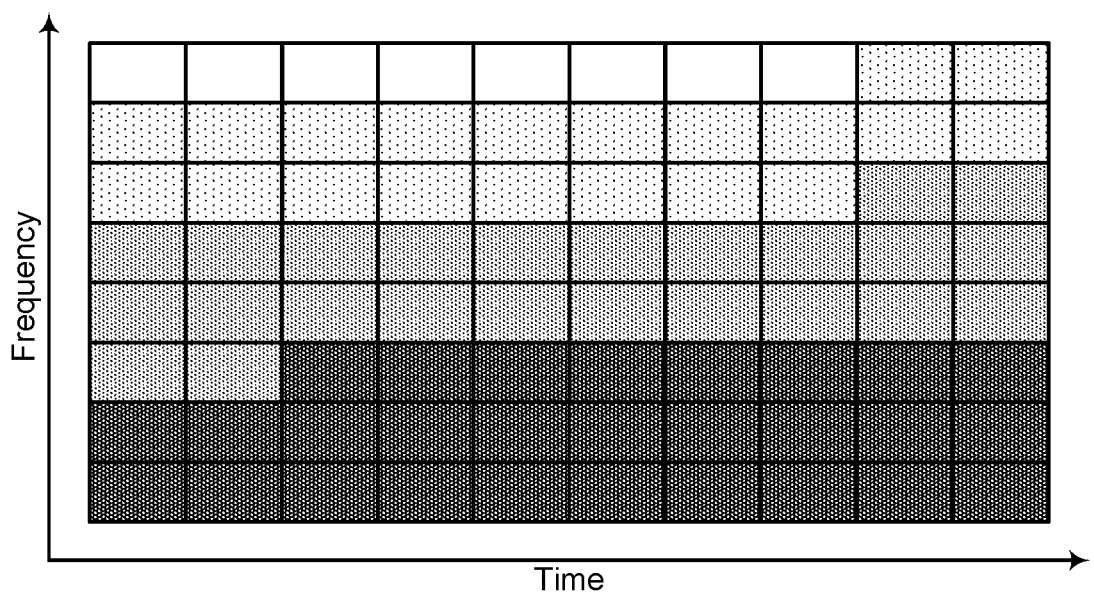
FIG. 3 illustrates an example of a set of resources allocated to user equipments (UEs) for transmitting group feedback for multicast transmissions in accordance with aspects of the present disclosure.

FIG. 3 illustrates an example of a set of resources 300 allocated to UEs 115 for transmitting feedback for multicast transmissions in accordance with aspects of the present disclosure. In the example of FIG. 3, the base station 105-a may allocate a first subset of resources 305 to UEs 115 in the first region 205 in FIG. 2, a second subset of resources 310 to the UEs 115 in the second region 210 in FIG. 2, a third subset of resources 315 to the UEs 115 in the third region 215, and a fourth subset of resources 320 to the UEs 115 in the fourth region 220. More resources may be allotted to UEs 115 in poor coverage than to UEs 115 in good coverage. The resources in FIG. 3 may be PUCCH resources allocated to each subset of UEs 115 (for example, in which each subset is denoted by a different shading). A PUCCH resource may be any combination of a time resource, a frequency resource, and an orthogonal sequence (for example, PUCCH sequence), in which the orthogonal sequence may be determined by cyclic shifts or spreading codes. In FIGS. 2 and 3, the subsets of resources may be allocated to respective subsets of UEs 115, in which each subset of UEs 115 is within a region spanning a specified range of distances from the base station 105-a (for example, physical distance from a base station tower). Further, each subset of UEs 115 may be defined or grouped based on a number of parameters (for example, such as the channel).

Once a UE 115 determines a subset of resources allocated for transmitting feedback to a base station 105 for transport blocks in a multicast transmission (for example, as depicted in FIG. 3 or otherwise), it may be appropriate for the UE 115 to indicate the specific transport blocks that the UE 115 failed to decode. To limit overhead, multiple UEs 115 may share resources for transmitting feedback for each transport block. For example, if multiple UEs 115 fail to decode the same transport block in the set of transport blocks, the UEs 115 may transmit feedback, such as a NACK, on the same resource. In some examples, however, if a UE 115 is configured to transmit feedback for each transport block, and the quantity of transport blocks that the UE 115 fails to decode is high, the overhead of transmitting the feedback may be high. The overhead may be further compounded if multiple UEs 115 are configured to transmit feedback for each transport block. The wireless communications system 100 may support efficient techniques for facilitating feedback from a UE 115 for a set of transport blocks in one or more multicast transmissions from a base station 105 (for example, with limited overhead).

Figure 4:
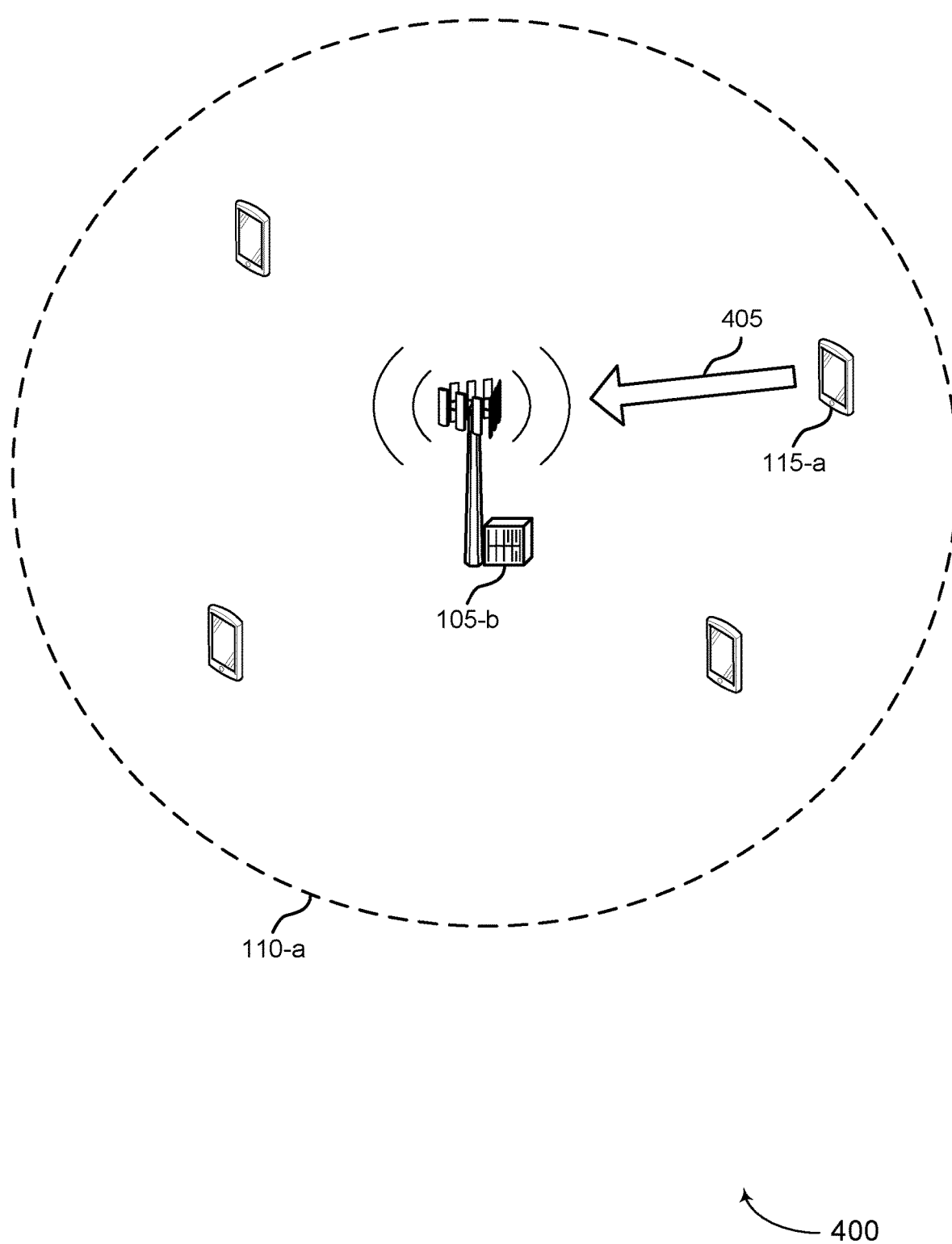
FIG. 4 illustrates an example of a wireless communications system that supports group feedback for multicast communications in accordance with aspects of the present disclosure.

FIG. 4 illustrates an example of a wireless communications system 400 that supports group feedback for multicast communications in accordance with aspects of the present disclosure. The wireless communications system 400 includes a UE 115-a, which may be an example of a UE 115 as described with reference to FIGS. 1-3. The wireless communications system 400 also includes a base station 105-b, which may be an example of a base station 105 as described with reference to FIGS. 1-3. The base station 105-b may provide communication coverage for a coverage area 110-a. The wireless communications system 400 may implement aspects of the wireless communications system 100 as described with reference to FIG. 1. For example, the wireless communications system 400 may support efficient techniques for allocating resources for feedback from a UE 115 for a multicast transmission (facilitating group feedback for multiple transport blocks in one or more multicast transmissions).

The base station 105-b may multicast a set of transport blocks to multiple UEs 115 including the UE 115-a. As described herein, the set of transport blocks may include a subset of transport blocks and a second subset of transport blocks, the subset of transport blocks and the second subset of transport blocks each may include two or more transport blocks, and each being associated with a respective control channel resource of a set of control channel resources. In the example of FIG. 4, the UE 115-a may fail to decode a subset of the set of transport blocks (for example, may fail to decode at least one transport block in one or more subsets of transport blocks of one or more sets of transport blocks, such as at least one transport block in a subset of transport blocks of a set of transport blocks). The UE 115-a may transmit ACK/NACK feedback to the base station 105-a on the carrier 405 to indicate the subset of the set of transport blocks that the UE 115-a failed to decode (such as at least one transport block in a subset of transport blocks of a set of transport blocks). In particular, the UE 115-a may transmit the ACK/NACK feedback on a PUCCH resource (for example a respective resources) corresponding to the subset of the set of transport blocks that the UE 115-a failed to decode (such as at least one transport block in a subset of transport blocks of a set of transport blocks). Because the PUCCH resource may correspond to or map to the subset of the set of transport blocks, the base station 105-a may be able to determine that the UE 115-a failed to decode the subset of the set of transport blocks (such as at least one transport block in a subset of transport blocks of a set of transport blocks). That is, the base station 105-a may receive the ACK/NACK feedback on the control channel resource, and the base station 105-a may determine that the UE 115-a failed to decode the subset of the set of transport blocks (such as at least one transport block in a subset of transport blocks of a set of transport blocks) based on receiving the ACK/NACK feedback on the control channel resource.

To allow the UE 115-a to indicate failure to decode different subsets of transport blocks, PUCCH resources allocated to the UE 115-a to report ACK/NACK feedback may be subdivided and mapped, respectively, to the different subsets of transport blocks. That is, if the UE 115-a is to transmit ACK/NACK feedback for multiple multicast transport blocks in one given PUCCH (for example, also referred to as a PUCCH occasion), the respective PUCCH resources allocated to the UE 115-a (for example, allocated as described in FIGS. 2 and 3 or otherwise) may be further subdivided according to the index set of the failed transport blocks for which feedback is to be provided. An index set of failed transport blocks may include the indices of the subset of transport blocks that a UE 115 failed to decode and may be referred to as a failed transport block index set. In some implementations, the base station 105-a may transmit a configuration message to the UE 115-a indicating a mapping of PUCCH resources to subsets of transport blocks. In other implementations, the UE 115-a may autonomously determine a mapping of PUCCH resources to subsets of transport blocks (for example, without signaling from the base station 105-b).

In some aspects, respective PUCCH resources determined by different cyclic-shift initializations (for example, in PUCCH Format 0 or 1) may correspond to different failed transport block index sets (for example, different subsets of transport blocks that a UE 115 failed to decode). In some aspects, respective PUCCH resources determined by different orthogonal Discrete Fourier Transform (DFT) spreading codes (for example, in PUCCH Format 1 resources) may correspond to different failed transport block index sets. In yet another aspect, respective PUCCH resources determined by different frequency locations (for example, different resource blocks (RBs)) may correspond to different failed transport block index sets. In yet another aspect, respective PUCCH resources determined by different time locations (for example, different symbol location(s) within a slot) may correspond to different failed transport block index sets.

As an example, a set of resources (for example, the fourth set of resources 320 in FIG. 3) may have a two-bit cyclic shift initialization for PUCCH sequences corresponding to feedback for two transport blocks (for example, in which the two transport blocks correspond to a set of transport blocks). In this example, ACK/NACK feedback on a PUCCH resource with a cyclic shift initialization of zero may indicate that the UE 115-a failed to decode both transport blocks (for example, both transport blocks failed or a subset of transport blocks that the UE 115-a failed to decode includes both transport blocks), ACK/NACK feedback on a PUCCH resource with a cyclic shift initialization of one may indicate that the UE 115-a failed to decode a first transport block and successfully decoded a second transport block (for example, transport block one failed and transport block two passed or a subset of transport blocks that the UE 115-a failed to decode includes transport block one), ACK/NACK feedback on a PUCCH resource with a cyclic shift initialization of two may indicate that the UE 115-a successfully decoded a first transport block and failed to decode a second transport block (for example, transport block one passed and transport block two failed or a subset of transport blocks that the UE 115-a failed to decode includes transport block two), and ACK/NACK feedback on a PUCCH resource with a cyclic shift initialization of three may be reserved (for example, or used for some other purpose, such as for channel state information (CSI) feedback in the case of ACK feedback). If cyclic shifts are used for multiplexing, there may be $2^M-1$ orthogonal cyclic shifts for feedback corresponding to M transport blocks. Although this example is provided for PUCCH resources with different cyclic shifts, this example is also applicable to PUCCH resources with different spreading codes, frequency locations, and time locations.

In addition to, or as an alternative to, using different PUCCH resources to indicate different failed transport block index sets, the UE 115-a may partition the frequency or time resources within a given PUCCH resource to indicate different subsets of transport blocks that the UE 115-a failed to decode. That is, different time or frequency resources within a PUCCH resource may correspond to different subsets of transport blocks (for example, multicast transport blocks). As an example, if one PUCCH resource has a total of $N_P$ subcarriers and is used to transmit ACK/NACK feedback corresponding to M multicast transport blocks, the $N_P$ subcarriers may be divided into M sub-resources, in which each sub-resource is of size $$\left\lceil \frac{N_P}{M} \right\rceil \text{ or } \left\lfloor \frac{N_P}{M} \right\rfloor$$

subcarriers and corresponds to a multicast transport block. The UE 115-a may transmit ACK/NACK feedback on those sub-resources (for example, light up or map the PUCCH payload or sequence to those sub-resources) that correspond to the indices of the failed transport blocks.

Figure 5:
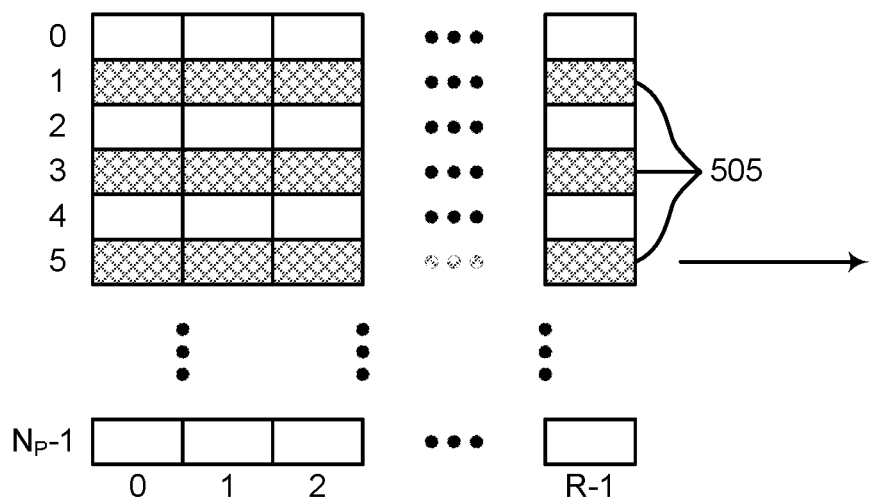
FIG. 5 illustrates an example of a physical uplink control channel (PUCCH) resource that may be partitioned into time or frequency resources corresponding to different subsets of transport blocks in accordance with aspects of the present disclosure.

FIG. 5 illustrates an example of a PUCCH resource 500 that may be partitioned into time or frequency resources corresponding to different subsets of transport blocks in accordance with aspects of the present disclosure. In the example of FIG. 5, the UE 115-a may transmit ACK/NACK feedback on the set of subcarriers 505 (for example, including subcarriers one, three, and five) to indicate a subset of transport blocks that the UE 115-a failed to decode. The PUCCH resource 500 may span $N_P$ subcarriers and R time intervals (for example, symbols). Different sub-resources of the PUCCH resource 500 (for example, different groups of time or frequency resources in the PUCCH resource 500) may correspond to different failed transport block index sets. In some implementations, each sub-resource may be staggered across the $N_P$ subcarriers (that is, the sub-resources may be non-contiguous or have a comb-like structure). Such implementations may be feasible for orthogonal frequency division multiplexing (OFDM)-based uplinks (for example, PUCCH Format 2 and potential modifications or extensions). Further, OFDM-based solutions may be different than DFT spread OFDM (DFT-s-OFDM)-based solutions.

In some examples, the phases of subcarriers used to transmit ACK/NACK feedback (for example, lit up tones) may be selected independently (for example, with the objective of minimizing a peak-to-average power ratio (PAPR)). Further, the power of subcarriers (for example, tones) in the sub-resources may be scaled appropriately, depending on the number of sub-resources used to transmit ACK/NACK feedback (for example, with the objective of maintaining a constant power spectral density). That is, a total transmit power may be allocated for transmitting ACK/NACK feedback in a PUCCH resource (for example, in the PUCCH resource 500), and the total transmit power may be constant irrespective of the time or frequency resources used to transmit ACK/NACK feedback in the PUCCH resource (for example, in the PUCCH resource 500) and irrespective of a subset of transport blocks that the UE 115-a failed to decode. The UE 115-a may perform power boosting or power de-boosting at the subcarrier level depending on the subset of the set of transport blocks that the UE 115-a failed to decode. In the example of FIG. 5, because the UE 115-a may transmit ACK/NACK feedback on three subcarriers to indicate the subset of transport blocks that the UE 115-a failed to decode, the UE 115-a may transmit the ACK/NACK feedback in each subcarrier using a ⅓ of the total transmit power allocated for that symbol. The UE 115-a may also apply a cell-specific scrambling to a PUCCH transmission of ACK/NACK feedback (for example, with the objective of preventing or reducing inter-cell interference).

In some examples, the techniques described herein may be allowed for up to a given value of M transport blocks, referred to as $M_{Thresh}$. That is, if the quantity of transport blocks in a multicast transmissions is less than $M_{Thresh}$, a UE 115 may transmit ACK/NACK feedback on a PUCCH resource indicating a subset of transport blocks that the UE 115 failed to decode. The value of $M_{Thresh}$ may be different for OFDM-based PUCCH and DFT-s-OFDM based PUCCH. If the number of multicast transport blocks for which feedback is to be sent in one PUCCH occasion is greater than $M_{Thresh}$, a UE 115 may fall back to, or may be configured to, transmit a dedicated unicast ACK/NACK feedback for multicast transport blocks or a dedicated multiplexed unicast ACK/NACK feedback corresponding to multicast transport blocks and other unicast transport blocks.

Further, in addition to, or as an alternative to, indicating the subset of transport blocks that a UE 115 failed to decode, the UE 115 may indicate a cardinality or quantity of the transport blocks that the UE 115 failed to decode. For instance, different PUCCH resources (for example, PUCCH resources associated with different cyclic shifts, spreading codes, frequency locations, or time locations) or different time or frequency resources within a PUCCH resource may correspond to different cardinalities of transport blocks that the UE 115 failed to decode, and the UE 115 may transmit ACK/NACK feedback on a PUCCH resource corresponding to the cardinality of transport blocks that the UE 115 failed to decode.

Figure 6:
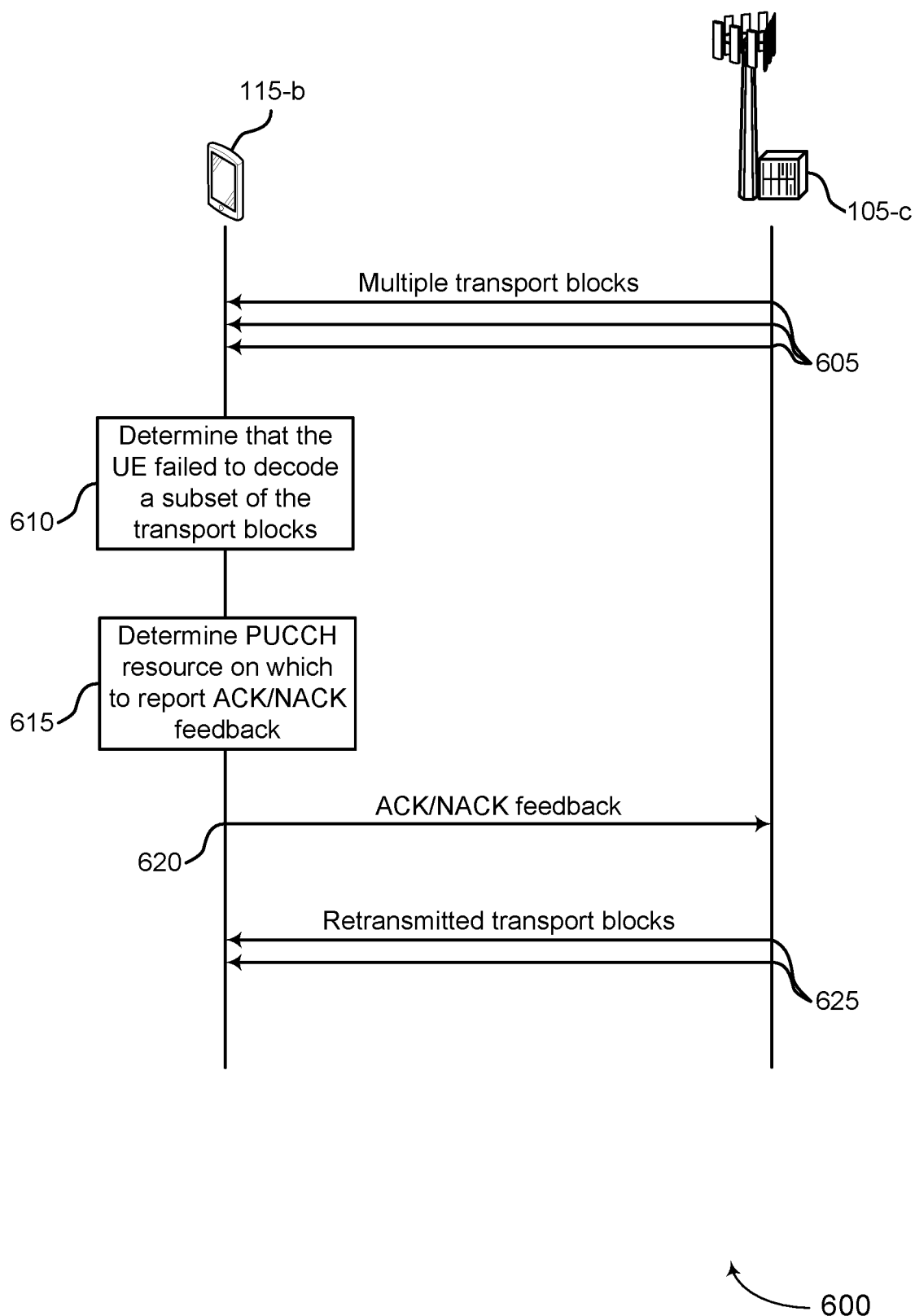
FIG. 6 illustrates an example of a process flow that supports group feedback for multicast communications in accordance with aspects of the present disclosure.

FIG. 6 illustrates an example of a process flow 600 that supports group feedback for multicast communications in accordance with aspects of the present disclosure. The process flow 600 illustrates aspects of techniques performed by a UE 115-b, which may be an example of a UE 115 as described with reference to FIGS. 1-5. The process flow 600 also illustrates aspects of techniques performed by a base station 105-c, which may be an example of a base station 105 as described with reference to FIGS. 1-5. The process flow 600 may support efficient techniques for facilitating ACK/NACK feedback from the UE 115-b to the base station 105-c for multiple transport blocks in a multicast transmission. Although the features described with reference to FIG. 6 are described from the perspective of one UE 116 (for example, the UE 115-b), the operations and the process may be performed by and related to one or more UEs 115, including that the one or more UEs 115 may transmit feedback over shared resources and may receive broadcast or multicast information that is transmitted by the base station 105-c.

At 605, the base station 105-c may transmit a set of transport blocks in a first multicast transmission, and the UE 115-b may monitor for the set of transport blocks in the first multicast transmission. At 610, the UE 115-b may attempt to receive and decode the set of transport blocks and may determine that the UE 115-b failed to decode a subset of the set of transport blocks.

At 615, the UE 115-b may then determine a control channel resource on which to transmit ACK/NACK feedback to the base station based on the subset of the set of transport blocks that the UE failed to decode. For example, the UE 115-b may determine a cyclic shift, a scrambling code, a frequency location, or a time location corresponding to the subset of transport blocks that the UE 115-b failed to decode, and the UE 115-b may determine to use the control channel resource associated with the cyclic shift, the scrambling code, the frequency location, or the time location to transmit ACK/NACK feedback to the base station 105-c. In some implementations, the UE 115-b may determine one or more time or frequency resources within the control channel resource corresponding to the subset of the set of transport blocks that the UE 115-b failed to decode.

In some aspects, the UE 115-b may determine the control channel resource from candidate control channel resources that are configured for a group of UEs including the UE 115-b. In such aspects, the base station 105-c may multicast downlink control information (DCI) scheduling a multicast PDSCH and a corresponding ACK/NACK PUCCH occasion. The base station 105-c may scramble the cyclic redundancy check (CRC) of the multicast DCI using a group or multicast radio network temporary identifier (RNTI), which may be addressed to the group of UEs (e.g., those UEs interested in receiving the multicast PDSCH as part of a multicast service). As a result, all UEs 115 may be directed to the same PUCCH occasions or PUCCH resources, and each UE 115 may use the techniques described herein to select a PUCCH resource on which to transmit ACK/NACK feedback.

At 620, the UE 115-b may transmit the ACK/NACK feedback to the base station 105-c on the control channel resource or on the time or frequency resources on the control channel resource. The control channel resource or the time or frequency resources on the control channel resource may indicate that the UE 115-b failed to decode the subset of the set of transport blocks. At 625, the base station 105-c may then retransmit the subset of the set of transport blocks in a second multicast transmission, and the UE 115-b may receive and decode the retransmitted subset of the set of transport blocks. In some aspects, the base station 105-c may transmit a configuration message to the UE 115-b mapping control channel resources to subsets of the set of transport blocks.

Further, in some implementations, the control channel resource or the time or frequency resources on the control channel resource may indicate a cardinality of the subset of the set of transport blocks that the UE 115-b failed to decode. In such implementations, the base station 105-c may retransmit transport blocks to the UE 115-b (for example, tailor the retransmission) based on the cardinality of the subset of the set of transport blocks that the UE 115-b failed to decode.

Figure 7:
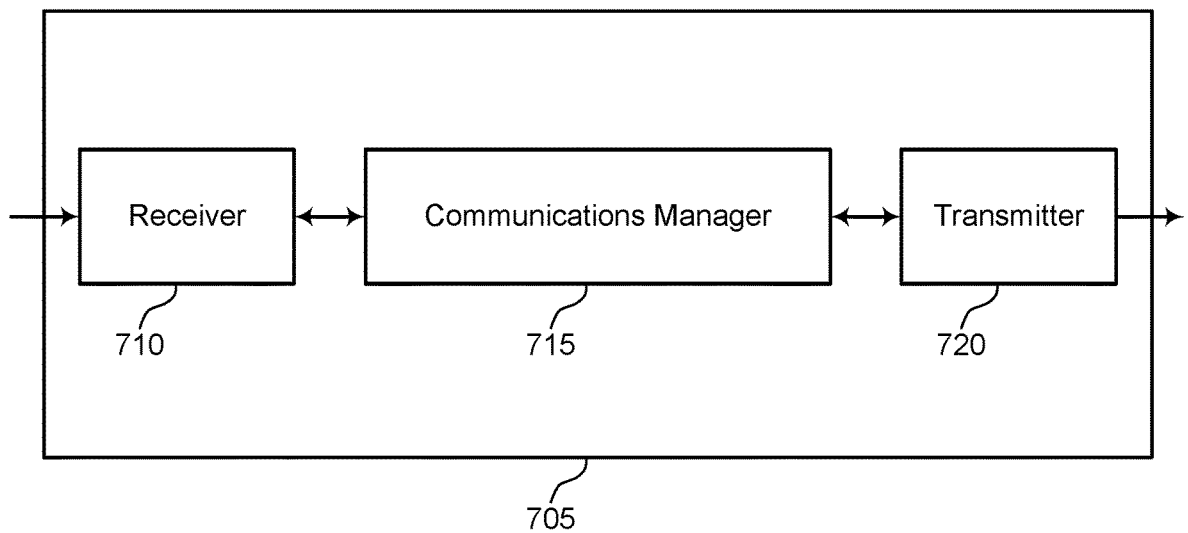
FIGS. 7 and 8 show block diagrams of devices that support group feedback for multicast communications in accordance with aspects of the present disclosure.

FIG. 7 shows a block diagram of a device 705 that supports group feedback for multicast communications in accordance with aspects of the present disclosure. The device 705 may be an example of aspects of a UE 115 as described herein. The device 705 may include a receiver 710, a communications manager 715, and a transmitter 720. The communications manager 715 can be implemented, at least in part, by one or both of a modem and a processor. Each of these components may be in communication with one another (for example, via one or more buses).

The receiver 710 may receive information such as packets, user data, or control information associated with various information channels (for example, control channels, data channels, and information related to group feedback for multicast communications). Information may be passed on to other components of the device 705. The receiver 710 may be an example of aspects of the transceiver 1020 described with reference to FIG. 10. The receiver 710 may utilize a single antenna or a set of antennas. The communications manager 715 may monitoring for a set of transport blocks transmitted from a base station in a multicast transmission, the set of transport blocks including a subset of transport blocks and a second subset of transport blocks, the subset of transport blocks and the second subset of transport blocks each including two or more transport blocks and each being associated with a respective control channel resource of a set of control channel resources, determine that the UE failed to decode at least one transport block of the subset of the set of transport blocks, determine the respective control channel resource associated with the subset of transport blocks on which to transmit feedback to the base station based at least in part on the subset of the set of transport blocks that the UE failed to decode, and transmit the feedback to the base station on the respective control channel resource associated with the subset of transport blocks.

The transmitter 720 may transmit signals generated by other components of the device 705. In some examples, the transmitter 720 may be collocated with a receiver 710 in a transceiver component. For example, the transmitter 720 may be an example of aspects of the transceiver 1020 described with reference to FIG. 10. The transmitter 720 may utilize a single antenna or a set of antennas.

Figure 8:
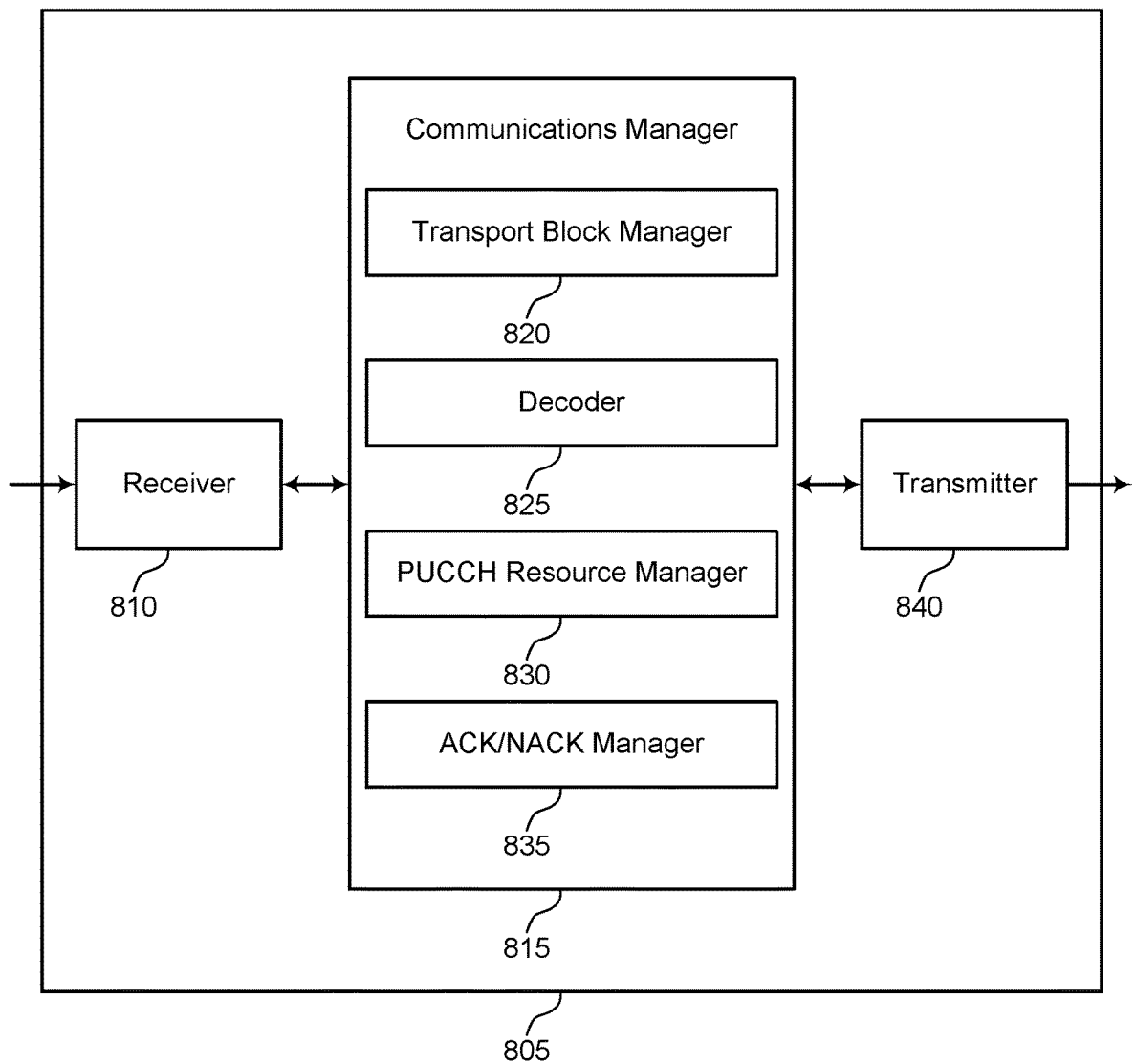

FIG. 8 shows a block diagram of a device 805 that supports group feedback for multicast communications in accordance with aspects of the present disclosure. The device 805 may be an example of aspects of a device 705, or a UE 115 as described herein. The device 805 may include a receiver 810, a communications manager 815, and a transmitter 840. The communications manager 815 can be implemented, at least in part, by one or both of a modem and a processor. Each of these components may be in communication with one another (for example, via one or more buses).

The receiver 810 may receive information such as packets, user data, or control information associated with various information channels (for example, control channels, data channels, and information related to group feedback for multicast communications). Information may be passed on to other components of the device 805. The receiver 810 may be an example of aspects of the transceiver 1020 described with reference to FIG. 10. The receiver 810 may utilize a single antenna or a set of antennas.

The communications manager 815 may include a transport block manager 820, a decoder 825, a PUCCH resource manager 830, and an ACK/NACK manager 835.

The transport block manager 820 may monitor for a set of transport blocks transmitted from a base station in a multicast transmission. The set of transport blocks may include a subset of transport blocks and a second subset of transport blocks, the subset of transport blocks and the second subset of transport blocks each including two or more transport blocks, and each being associated with a respective control channel resource of a set of control channel resources. The decoder 825 may determine that the UE failed to decode at least one transport block of a subset of the set of transport blocks. The PUCCH resource manager 830 may determine a respective control channel resource associated with the subset of transport blocks on which to transmit feedback to the base station based on the subset of the set of transport blocks that the UE failed to decode. The ACK/NACK manager 835 may transmit the feedback to the base station on the respective control channel resource associated with the subset of transport blocks.

The transmitter 840 may transmit signals generated by other components of the device 805. In some examples, the transmitter 840 may be collocated with a receiver 810 in a transceiver component. For example, the transmitter 840 may be an example of aspects of the transceiver 1020 described with reference to FIG. 10. The transmitter 840 may utilize a single antenna or a set of antennas.

Figure 9:
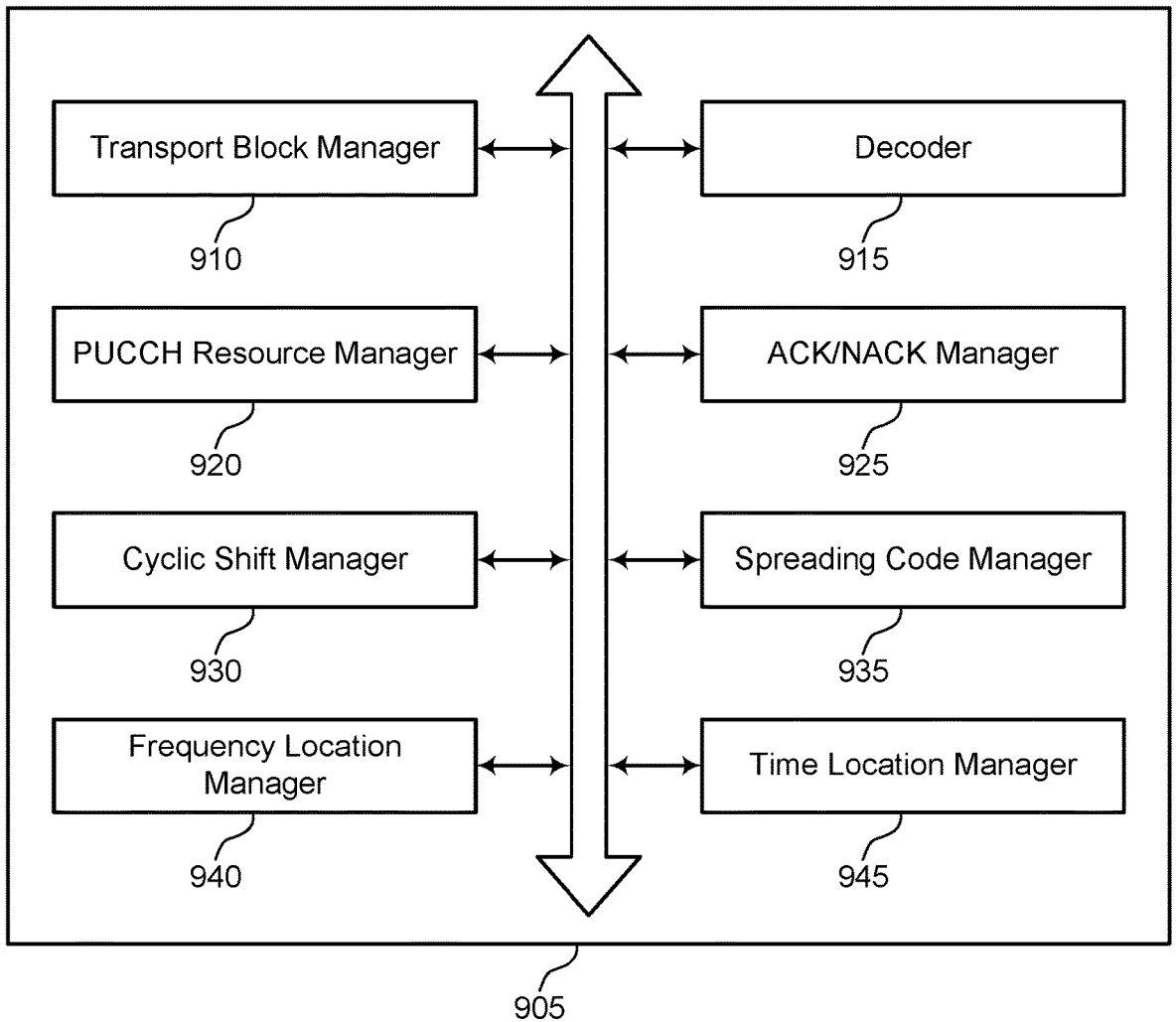
FIG. 9 shows a block diagram of a communications manager that supports group feedback for multicast communications in accordance with aspects of the present disclosure.

FIG. 9 shows a block diagram of a communications manager 905 that supports group feedback for multicast communications in accordance with aspects of the present disclosure. The communications manager 905 may be an example of aspects of a communications manager 715, a communications manager 815, or a communications manager 1010 described herein. The communications manager 905 may include a transport block manager 910, a decoder 915, a PUCCH resource manager 920, an ACK/NACK manager 925, a cyclic shift manager 930, a spreading code manager 935, a frequency location manager 940, and a time location manager 945. Each of these components may communicate, directly or indirectly, with one another (for example, via one or more buses).

The transport block manager 910 may monitor for a set of transport blocks transmitted from a base station in a multicast transmission. The set of transport blocks may include a subset of transport blocks and a second subset of transport blocks, the subset of transport blocks and the second subset of transport blocks each including two or more transport blocks, and each being associated with a respective control channel resource of a set of control channel resources. The decoder 915 may determine that the UE failed to decode at least one transport block of a subset of the set of transport blocks. The PUCCH resource manager 920 may determine a respective control channel resource associated with the subset of transport blocks on which to transmit feedback to the base station based on the subset of the set of transport blocks that the UE failed to decode. The ACK/NACK manager 925 may transmit the feedback to the base station on the respective control channel resource associated with the subset of transport blocks.

In some examples, the control channel resource indicates that the UE failed to decode at least one transport block of the subset of the set of transport blocks. The cyclic shift manager 930 may determine a cyclic shift corresponding to the subset of the set of transport blocks that the UE failed to decode. In some examples, the PUCCH resource manager 920 may determine the respective control channel resource associated with the determined cyclic shift on which to report the feedback. The spreading code manager 935 may determine a spreading code corresponding to the at least one transport block of the subset of the set of transport blocks that the UE failed to decode. In some examples, the PUCCH resource manager 920 may determine the respective control channel resource associated with the determined spreading code on which to report the feedback.

The frequency location manager 940 may determine a frequency location corresponding to the subset of the set of transport blocks that the UE failed to decode. In some examples, the PUCCH resource manager 920 may determine the respective control channel resource at the determined frequency location on which to report the feedback. The time location manager 945 may determine a time location corresponding to the at least one transport block of the subset of the set of transport blocks that the UE failed to decode. In some examples, the PUCCH resource manager 920 may determine respective the control channel resource at the determined time location on which to report the feedback. In some examples, determining one or more time or frequency resources within the control channel resource corresponding to the at least one transport block of the subset of the set of transport blocks that the UE failed to decode, in which transmitting the feedback to the base station on the control channel resource includes transmitting the feedback on the one or more time or frequency resources within the control channel resource.

In some examples, the PUCCH resource manager 920 may select one or more phases for transmitting the feedback on the one or more time or frequency resources within the control channel resource to reduce a peak-to-average power ratio, in which transmitting the feedback to the base station on the control channel resource is based on selecting the one or more phases. In some examples, the PUCCH resource manager 920 may select a transmit power for transmitting the feedback on the one or more time or frequency resources within the control channel resource, in which a total transmit power within the control channel resource is constant irrespective of the subset of the set of transport blocks that the UE failed to decode, and in which transmitting the feedback to the base station on the control channel resource is based on selecting the transmit power.

In some examples, the PUCCH resource manager 920 may use a cell-specific scrambling for transmitting the feedback on the one or more time or frequency resources within the control channel resource, in which transmitting the feedback to the base station on the control channel resource is based on using the cell-specific scrambling. In some examples, the PUCCH resource manager 920 may determine a subset of a set of control channel resources allocated for transmitting feedback to the base station based on a channel metric of the UE, in which the control channel resource used to transmit the feedback is in the subset of the set of control channel resources. In some examples, the channel metric includes an RSRP, an RSSI, a beamform angle-of-arrival, a beamform angle-of-departure, a transmit beam, a receive beam, a geographical location, an interference level, a channel state information metric, a throughput level, or any combination thereof.

In some examples, receiving a configuration message mapping control channel resources to subsets of the set of transport blocks, in which transmitting the feedback includes transmitting the feedback on the control channel resource corresponding to the subset of the set of transport blocks that the UE failed to decode. In some examples, the PUCCH resource manager 920 may determine the respective control channel resource on which to transmit the feedback to the base station is based on a quantity of the set of transport blocks in the multicast transmission being less than or equal to a threshold. In some examples, the PUCCH resource manager 920 may determine the respective control channel resource on which to transmit the feedback to the base station is based on a cardinality of the subset of the set of transport blocks that the UE failed to decode. In some examples, the PUCCH resource manager 920 may determine the respective control channel resource from candidate control channel resources that are configured for a group of UEs including the UE. In some examples, the feedback includes ACK or NACK feedback.

Figure 10:
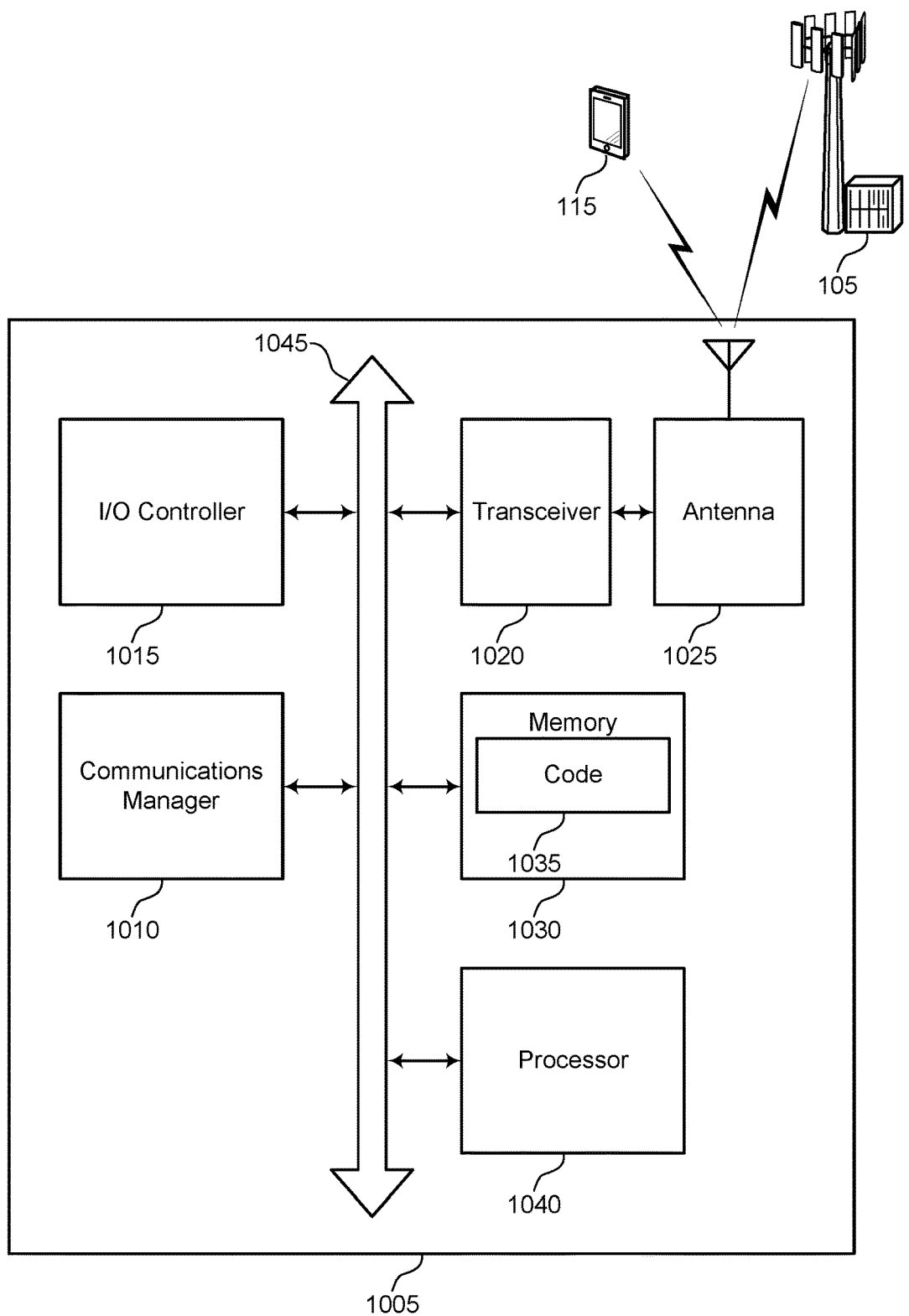
FIG. 10 shows a diagram of a system including a device that supports group feedback for multicast communications in accordance with aspects of the present disclosure.

FIG. 10 shows a diagram of a system including a device 1005 that supports group feedback for multicast communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (for example, bus 1045). The communications manager 1010 may monitor for a set of transport blocks transmitted from a base station in a multicast transmission. The set of transport blocks may include a subset of transport blocks and a second subset of transport blocks, and the subset of transport blocks and the second subset of transport blocks may each include two or more transport blocks and each being associated with a respective control channel resource of a set of control channel resources, determine that the UE failed to decode at least one transport block of the subset of the set of transport blocks, determine the respective control channel resource associated with the subset of transport blocks on which to transmit feedback to the base station based at least in part on the subset of the set of transport blocks that the UE failed to decode, and transmit the feedback to the base station on the respective control channel resource associated with the subset of transport blocks.

The I/O controller 1015 may manage input and output signals for the device 1005. The I/O controller 1015 may also manage peripherals not integrated into the device 1005. In some examples, the I/O controller 1015 may represent a physical connection or port to an external peripheral. In some examples, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some examples, the I/O controller 1015 may be implemented as part of a processor. In some examples, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some examples, the wireless device may include a single antenna 1025. However, in some examples the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, if executed, cause the processor to perform various functions described herein. In some examples, the memory 1030 may contain, among other things, a BIOS, which may control basic hardware or software operation such as the interaction with peripheral components or devices.

The processor 1040 may include an intelligent hardware device, (for example, a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some examples, the processor 1040 may be configured to operate a memory array using a memory controller. In other cases, a memory controller may be integrated into the processor 1040. The processor 1040 may be configured to execute computer-readable instructions stored in a memory (for example, the memory 1030) to cause the device 1005 to perform various functions (for example, functions or tasks supporting group feedback for multicast communications).

The code 1035 may include instructions to implement aspects of the present disclosure, including instructions to support wireless communications. The code 1035 may be stored in a non-transitory computer-readable medium such as system memory or other type of memory. In some examples, the code 1035 may not be directly executable by the processor 1040 but may cause a computer (for example, if compiled and executed) to perform functions described herein.

Figure 11:
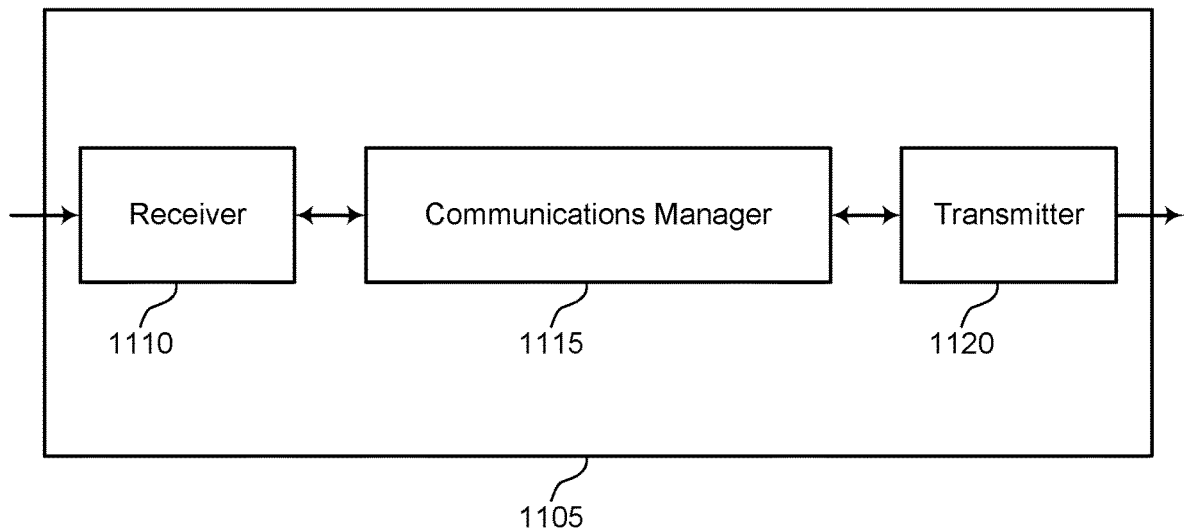
FIGS. 11 and 12 show block diagrams of devices that support group feedback for multicast communications in accordance with aspects of the present disclosure.

FIG. 11 shows a block diagram of a device 1105 that supports group feedback for multicast communications in accordance with aspects of the present disclosure. The device 1105 may be an example of aspects of a base station 105 as described herein. The device 1105 may include a receiver 1110, a communications manager 1115, and a transmitter 1120. The communications manager 1115 can be implemented, at least in part, by one or both of a modem and a processor. Each of these components may be in communication with one another (for example, via one or more buses).

The receiver 1110 may receive information such as packets, user data, or control information associated with various information channels (for example, control channels, data channels, and information related to group feedback for multicast communications). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit a set of transport blocks in a first multicast transmission, the set of transport blocks including a subset of transport blocks and a second subset of transport blocks, the subset of transport blocks and the second subset of transport blocks each including two or more transport blocks and each being associated with a respective control channel resource of a set of control channel resources, receive, from a UE based on the first multicast transmission, feedback on the respective control channel resource associated with the subset of transport blocks, determine that the control channel resource associated with the subset of transport blocks indicates that the UE failed to decode at least one transport block of the subset of the set of transport blocks, and retransmit the subset of the set of transport blocks in a second multicast transmission based on the determining.

The transmitter 1120 may transmit signals generated by other components of the device 1105. In some examples, the transmitter 1120 may be collocated with a receiver 1110 in a transceiver component. For example, the transmitter 1120 may be an example of aspects of the transceiver 1420 described with reference to FIG. 14. The transmitter 1120 may utilize a single antenna or a set of antennas.

Figure 12:
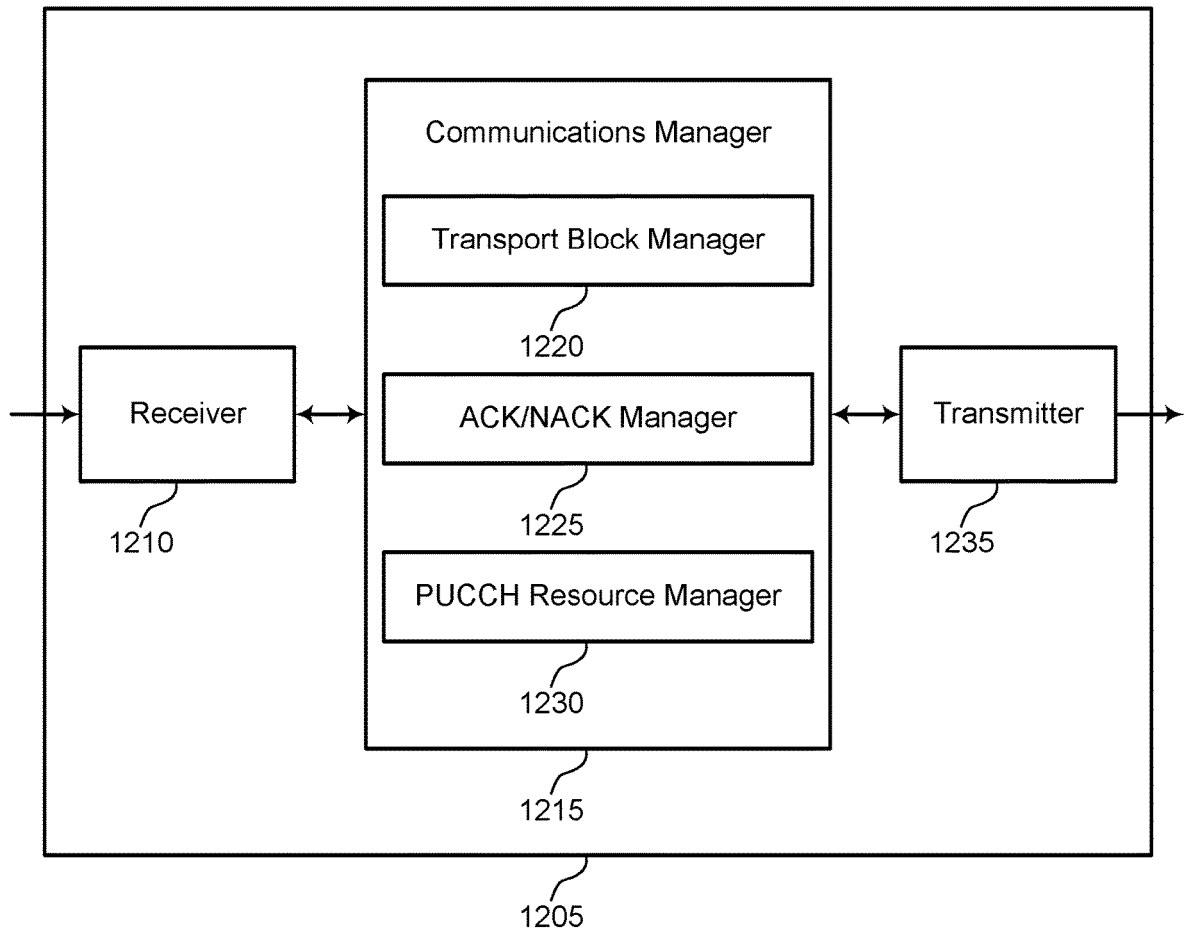

FIG. 12 shows a block diagram of a device 1205 that supports group feedback for multicast communications in accordance with aspects of the present disclosure. The device 1205 may be an example of aspects of a device 1105, or a base station 105 as described herein. The device 1205 may include a receiver 1210, a communications manager 1215, and a transmitter 1235. The communications manager 1215 can be implemented, at least in part, by one or both of a modem and a processor. Each of these components may be in communication with one another (for example, via one or more buses).

The receiver 1210 may receive information such as packets, user data, or control information associated with various information channels (for example, control channels, data channels, and information related to group feedback for multicast communications). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may include a transport block manager 1220, an ACK/NACK manager 1225, and a PUCCH resource manager 1230.

The transport block manager 1220 may transmit a set of transport blocks in a first multicast transmission. The set of transport blocks may include a subset of transport blocks and a second subset of transport blocks, the subset of transport blocks and the second subset of transport blocks each may include two or more transport blocks, and each being associated with a respective control channel resource of a set of control channel resources. The ACK/NACK manager 1225 may receive, from a UE based on the first multicast transmission, feedback on the respective control channel resource associated with the subset of transport blocks. The PUCCH resource manager 1230 may determine that the control channel resource associated with the subset of transport blocks indicates that the UE failed to decode at least one transport block of the subset of the set of transport blocks. The transport block manager 1220 may retransmit the subset of the set of transport blocks in a second multicast transmission based on the determining.

The transmitter 1235 may transmit signals generated by other components of the device 1205. In some examples, the transmitter 1235 may be collocated with a receiver 1210 in a transceiver component. For example, the transmitter 1235 may be an example of aspects of the transceiver 1420 described with reference to FIG. 14. The transmitter 1235 may utilize a single antenna or a set of antennas.

Figure 13:
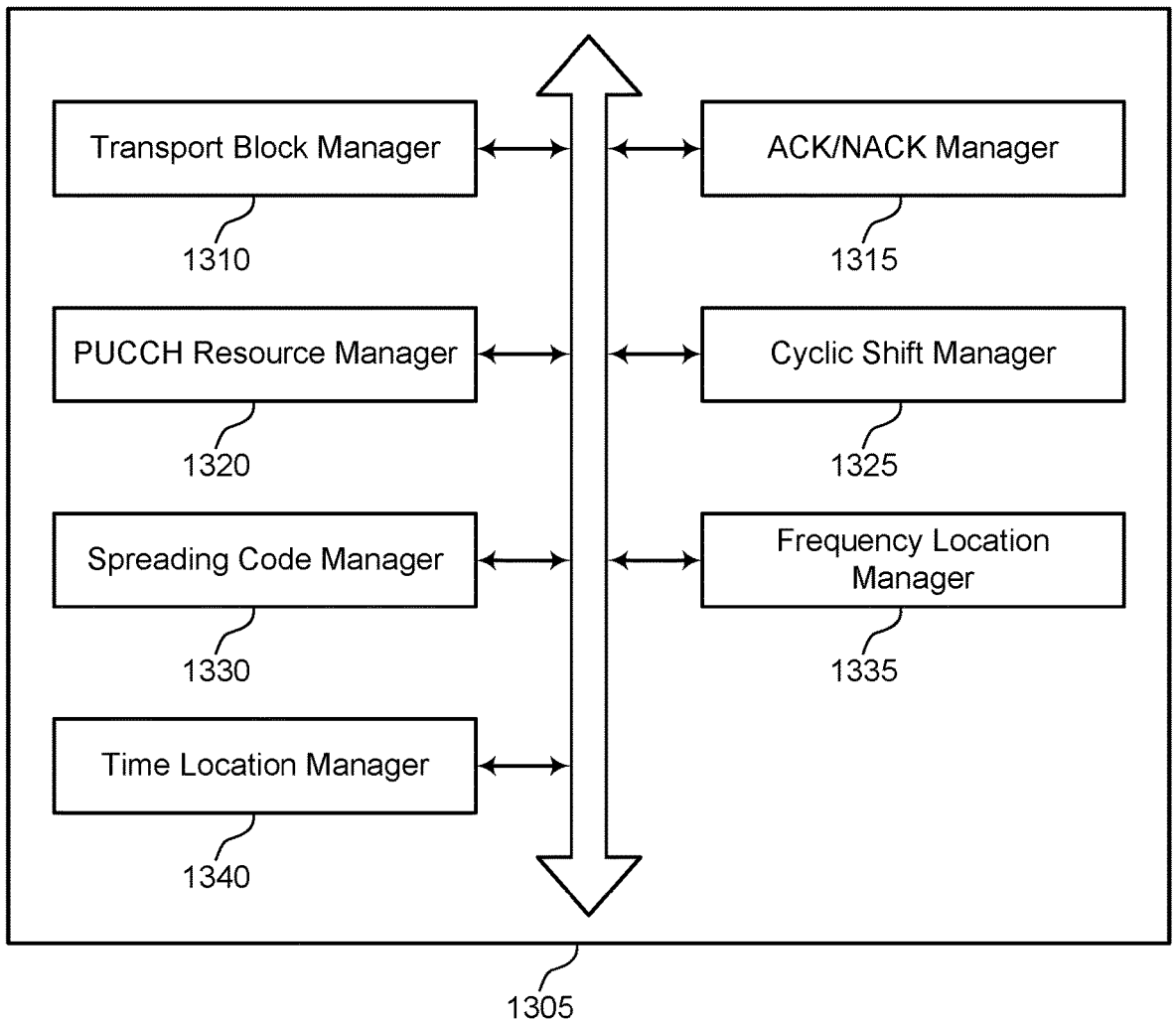
FIG. 13 shows a block diagram of a communications manager that supports group feedback for multicast communications in accordance with aspects of the present disclosure.

FIG. 13 shows a block diagram of a communications manager 1305 that supports group feedback for multicast communications in accordance with aspects of the present disclosure. The communications manager 1305 may include a transport block manager 1310, an ACK/NACK manager 1315, a PUCCH resource manager 1320, a cyclic shift manager 1325, a spreading code manager 1330, a frequency location manager 1335, and a time location manager 1340. Each of these components may communicate, directly or indirectly, with one another (for example, via one or more buses).

The transport block manager 1310 may transmit a set of transport blocks in a first multicast transmission. The set of transport blocks may include a subset of transport blocks and a second subset of transport blocks, the subset of transport blocks and the second subset of transport blocks each may include two or more transport blocks, and each being associated with a respective control channel resource of a set of control channel resources. The ACK/NACK manager 1315 may receive, from a UE based on the first multicast transmission, feedback on the respective control channel resource associated with the subset of transport blocks. The PUCCH resource manager 1320 may determine that the control channel resource associated with the subset of transport blocks indicates that the UE failed to decode at least one transport block of the subset of the set of transport blocks. In some examples, the transport block manager 1310 may retransmit the subset of the set of transport blocks in a second multicast transmission based on the determining.

The cyclic shift manager 1325 may determine a cyclic shift associated with the control channel resource on which the feedback is received. In some examples, the cyclic shift manager 1325 may determine that the cyclic shift corresponds to the subset of the set of transport blocks. The spreading code manager 1330 may determine a spreading code associated with the control channel resource on which the feedback is received. In some examples, the spreading code manager 1330 may determine that the spreading code corresponds to the subset of the set of transport blocks.

The frequency location manager 1335 may determine a frequency location of the control channel resource on which the feedback is received. In some examples, the frequency location manager 1335 may determine that the frequency location corresponds to the subset of the set of transport blocks. The time location manager 1340 may determine a time location of the control channel resource on which the feedback is received. In some examples, the time location manager 1340 may determine that the time location corresponds to the subset of the set of transport blocks. In some examples, the PUCCH resource manager 1320 may determine one or more time or frequency resources within the control channel resource on which the feedback is received. In some examples, the PUCCH resource manager 1320 may determine that the one or more of the time or frequency resources correspond to the subset of the set of transport blocks.

In some examples, the PUCCH resource manager 1320 may transmit a configuration message mapping control channel resources to subsets of the set of transport blocks, in which receiving the feedback on the control channel resource is based on transmitting the configuration message. In some examples, the PUCCH resource manager 1320 may determine that the respective control channel resource indicates that the UE failed to decode at least one transport block of the subset of the set of transport blocks is based on a quantity of the set of transport blocks in the first multicast transmission being less than or equal to a threshold. In some examples, the transport block manager 1310 may determine a cardinality of the at least one transport block of the subset of the set of transport blocks that the UE failed to decode based on the respective control channel resource on which the feedback is received. In some examples, the feedback includes ACK or NACK feedback.

Figure 14:
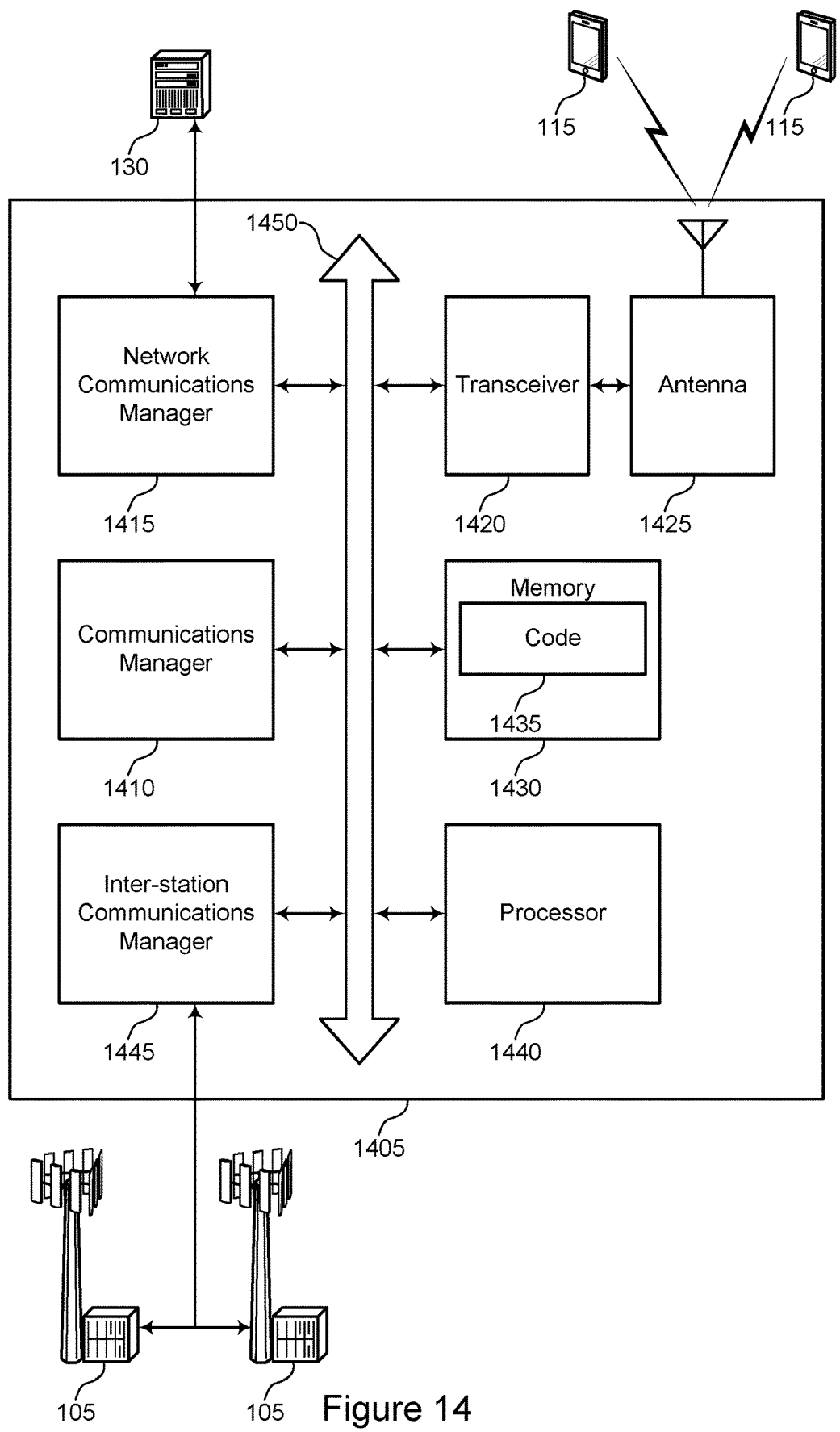
FIG. 14 shows a diagram of a system including a device that supports group feedback for multicast communications in accordance with aspects of the present disclosure.

FIG. 14 shows a diagram of a system including a device 1405 that supports group feedback for multicast communications in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (for example, bus 1450).

The communications manager 1410 may transmit a set of transport blocks in a first multicast transmission, the set of transport blocks including a subset of transport blocks and a second subset of transport blocks, the subset of transport blocks and the second subset of transport blocks each including two or more transport blocks and each being associated with a respective control channel resource of a set of control channel resources, receive, from a UE based on the first multicast transmission, feedback on the respective control channel resource associated with the subset of transport blocks, determine that the control channel resource associated with the subset of transport blocks indicates that the UE failed to decode at least one transport block of the subset of the set of transport blocks, and retransmit the subset of the set of transport blocks in a second multicast transmission based on the determining.

The network communications manager 1415 may manage communications with the core network (for example, via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some examples, the wireless device may include a single antenna 1425. However, in some examples the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, if executed by a processor (for example, the processor 1440) cause the device to perform various functions described herein. In some examples, the memory 1430 may contain, among other things, a BIOS, which may control basic hardware or software operation such as the interaction with peripheral components or devices.

The processor 1440 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1440 may be configured to operate a memory array using a memory controller. In some examples, a memory controller may be integrated into processor 1440. The processor 1440 may be configured to execute computer-readable instructions stored in a memory (for example, the memory 1430) to cause the device 1405 to perform various functions (for example, functions or tasks supporting group feedback for multicast communications).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some examples, the code 1435 may not be directly executable by the processor 1440 but may cause a computer (for example, if compiled and executed) to perform functions described herein.

Figure 15:
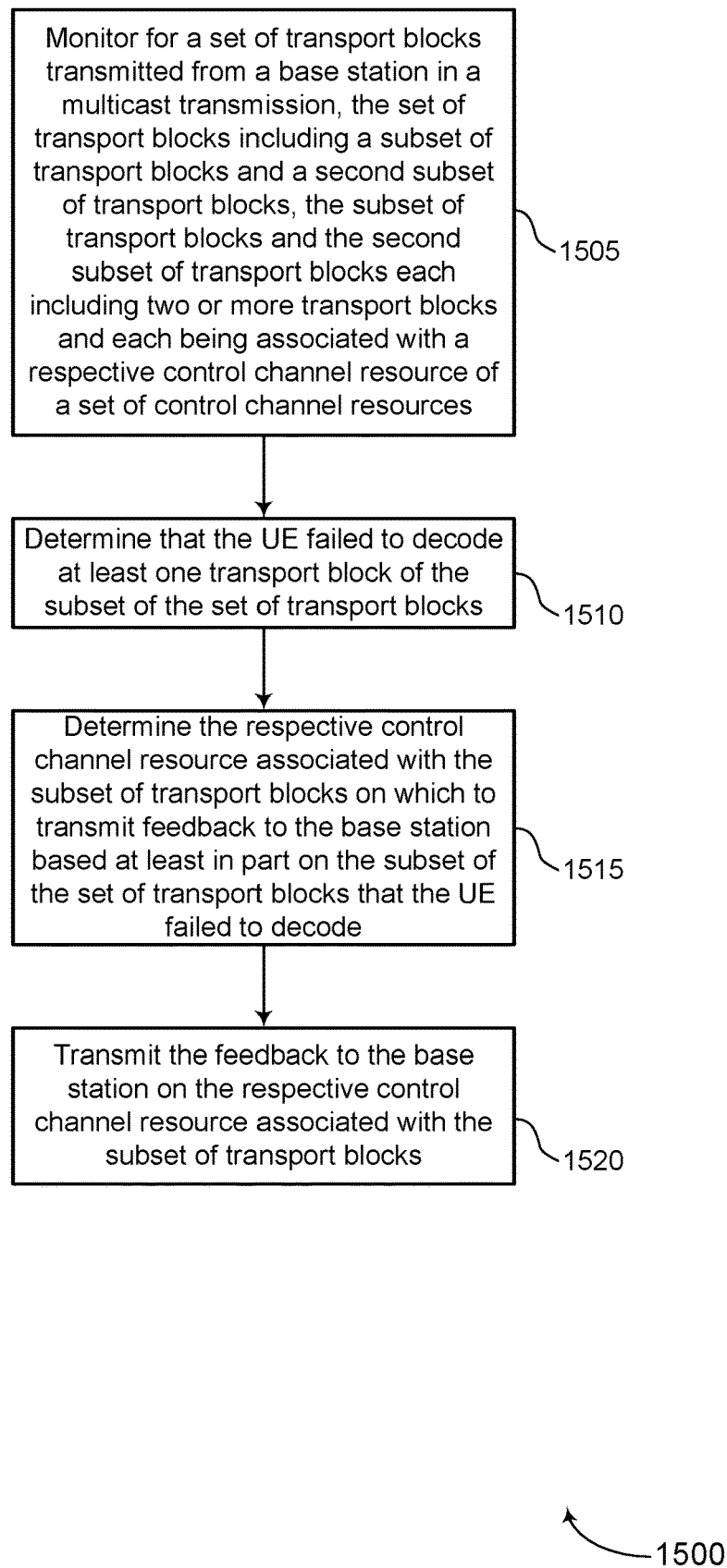
FIGS. 15 and 16 show flowcharts illustrating methods that support group feedback for multicast communications in accordance with aspects of the present disclosure.

FIG. 15 shows a flowchart illustrating a method 1500 that supports group feedback for multicast communications in accordance with aspects of the present disclosure. The operations of method 1500 may be implemented by a UE 115 or its components as described herein. For example, the operations of method 1500 may be performed by a communications manager as described with reference to FIGS. 7-10. In some examples, a UE may execute a set of instructions to control the functional elements of the UE to perform the functions described below. Additionally, or alternatively, a UE may perform aspects of the functions described below using special-purpose hardware.

At 1505, the UE may monitor for a set of transport blocks transmitted from a base station in a multicast transmission. The set of transport blocks may include a subset of transport blocks and a second subset of transport blocks, the subset of transport blocks and the second subset of transport blocks each may include two or more transport blocks, and each being associated with a respective control channel resource of a set of control channel resources. The operations of 1505 may be performed according to the methods described herein. In some examples, aspects of the operations of 1505 may be performed by a transport block manager as described with reference to FIGS. 7-10.

At 1510, the UE may determine that the UE failed to decode at least one transport block of the subset of the set of transport blocks. The operations of 1510 may be performed according to the methods described herein. In some examples, aspects of the operations of 1510 may be performed by a decoder as described with reference to FIGS. 7-10.

At 1515, the UE may determine the respective control channel resource associated with the subset of transport blocks on which to transmit feedback to the base station based at least in part on the subset of the set of transport blocks that the UE failed to decode. The operations of 1515 may be performed according to the methods described herein. In some examples, aspects of the operations of 1515 may be performed by a PUCCH resource manager as described with reference to FIGS. 7-10.

At 1520, the UE may transmit the feedback to the base station on the respective control channel resource associated with the subset of transport blocks. The operations of 1520 may be performed according to the methods described herein. In some examples, aspects of the operations of 1520 may be performed by an ACK/NACK manager as described with reference to FIGS. 7-10.

Figure 16:
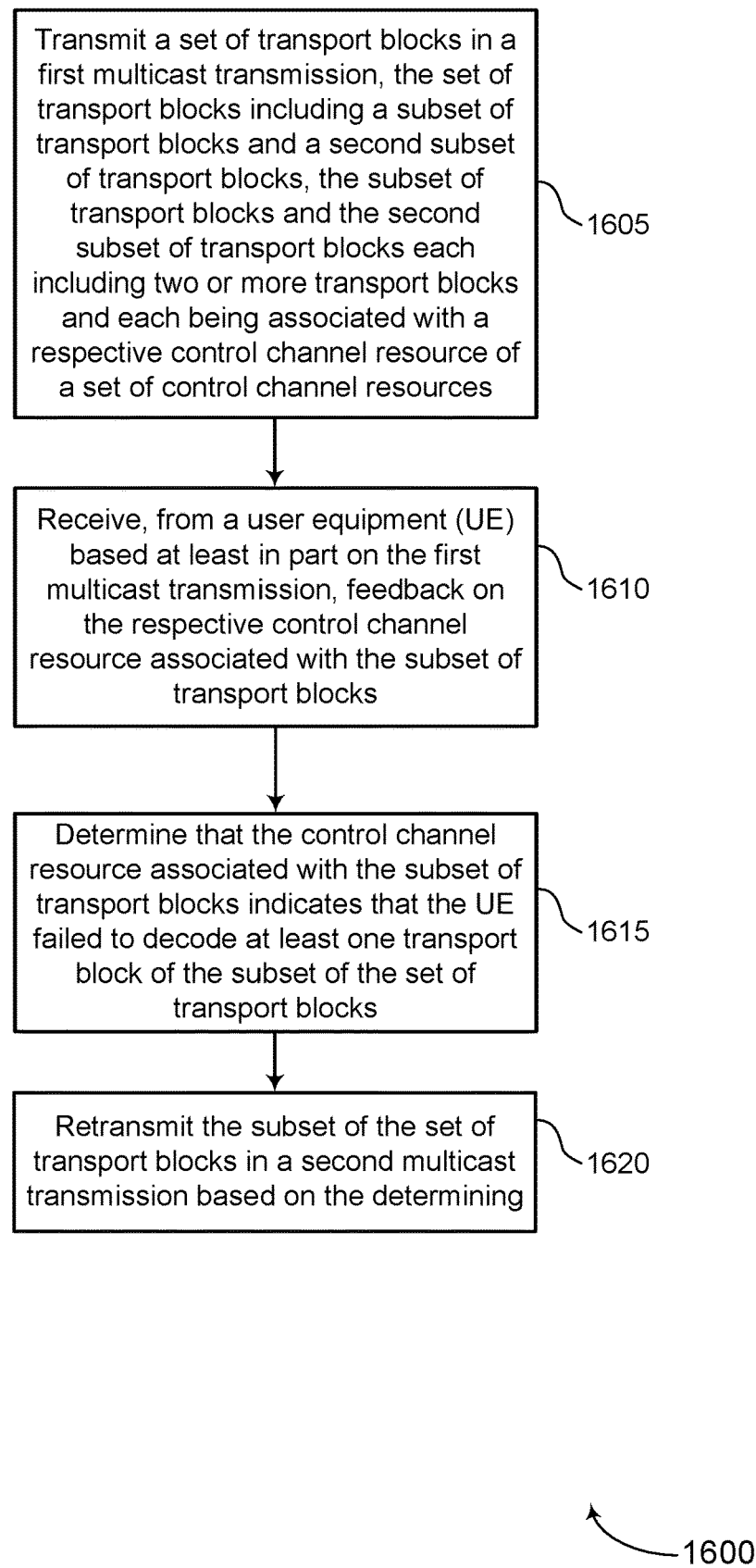

FIG. 16 shows a flowchart illustrating a method 1600 that supports group feedback for multicast communications in accordance with aspects of the present disclosure. The operations of method 1600 may be implemented by a base station 105 or its components as described herein. For example, the operations of method 1600 may be performed by a communications manager as described with reference to FIGS. 11-14. In some examples, a base station may execute a set of instructions to control the functional elements of the base station to perform the functions described below. Additionally, or alternatively, a base station may perform aspects of the functions described below using special-purpose hardware.

At 1605, the base station may transmit a set of transport blocks in a first multicast transmission. The set of transport blocks may include a subset of transport blocks and a second subset of transport blocks, the subset of transport blocks and the second subset of transport blocks each may include two or more transport blocks, and each being associated with a respective control channel resource of a set of control channel resources. The operations of 1605 may be performed according to the methods described herein. In some examples, aspects of the operations of 1605 may be performed by a transport block manager as described with reference to FIGS. 11-14.

At 1610, the base station may receive, from a UE based on the first multicast transmission, feedback on the respective control channel resource associated with the subset of transport blocks. The operations of 1610 may be performed according to the methods described herein. In some examples, aspects of the operations of 1610 may be performed by an ACK/NACK manager as described with reference to FIGS. 11-14.

At 1615, the base station may determine that the control channel resource associated with the subset of transport blocks indicates that the UE failed to decode at least one transport block of the subset of the set of transport blocks. The operations of 1615 may be performed according to the methods described herein. In some examples, aspects of the operations of 1615 may be performed by a PUCCH resource manager as described with reference to FIGS. 11-14.

At 1620, the base station may retransmit the subset of the set of transport blocks in a second multicast transmission based on the determining. The operations of 1620 may be performed according to the methods described herein. In some examples, aspects of the operations of 1620 may be performed by a transport block manager as described with reference to FIGS. 11-14.

It is noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc in which disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (that is, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. The disclosure is not limited to the examples and designs described herein, but is to be accorded the broadest scope consistent with the principles and novel features disclosed herein.

What is claimed is:

1. A method for wireless communication at a user equipment (UE), comprising:
    monitoring for a set of transport blocks transmitted from a network entity in a multicast transmission, the set of transport blocks comprising a first subset of transport blocks and a second subset of transport blocks, the first subset of transport blocks and the second subset of transport blocks each comprising two or more transport blocks, the set of transport blocks associated with a set of control channel resources, the set of control channel resources comprising a first control channel resource and a second control channel resource, the first subset of transport blocks being associated with the first control channel resource, and the second subset of transport blocks being associated with the second control channel; and
    transmitting feedback to the network entity on the first control channel resource associated with the first subset of transport blocks, the feedback indicating that the UE failed to decode at least one transport block of the first subset of the set of transport blocks.

2. The method of claim 1, wherein the first control channel resource associated with the first subset of transport blocks indicates that the UE failed to decode the at least one transport block of the first subset of the set of transport blocks.

3. The method of claim 1, further comprising:
    determining a cyclic shift corresponding to the at least one transport block of the first subset of the set of transport blocks that the UE failed to decode; and
    determining the first control channel resource associated with the determined cyclic shift on which to report the feedback.

4. The method of claim 1, further comprising:
    determining a spreading code corresponding to the at least one transport block of the first subset of the set of transport blocks that the UE failed to decode; and
    determining the first control channel resource associated with the determined spreading code on which to report the feedback.

5. The method of claim 1, further comprising:
    determining a frequency location corresponding to the at least one transport block of the first subset of the set of transport blocks that the UE failed to decode; and
    determining the first control channel resource at the determined frequency location on which to report the feedback.

6. The method of claim 1, further comprising:
    determining a time location corresponding to the at least one transport block of the first subset of the set of transport blocks that the UE failed to decode; and
    determining the first control channel resource at the determined time location on which to report the feedback.

7. The method of claim 1, further comprising determining one or more time or frequency resources within the first control channel resources corresponding to the at least one transport block of the first subset of the set of transport blocks that the UE failed to decode, wherein transmitting the feedback to the network entity on the first control channel resource comprises transmitting the feedback on the one or more time or frequency resources within the first control channel resource.

8. The method of claim 7, further comprising selecting one or more phases for transmitting the feedback on the one or more time or frequency resources within the first control channel resource to reduce a peak-to-average power ratio, wherein transmitting the feedback to the network entity on the first control channel resource is based at least in part on selecting the one or more phases.

9. The method of claim 7, further comprising selecting a transmit power for transmitting the feedback on the one or more time or frequency resources within the first control channel resource, wherein a total transmit power within the first control channel resource is constant irrespective of the at least one transport block of the first subset of the set of transport blocks that the UE failed to decode, and wherein transmitting the feedback to the network entity on the first control channel resource is based at least in part on selecting the transmit power.

10. The method of claim 7, further comprising using a cell-specific scrambling for transmitting the feedback on the one or more time or frequency resources within the first control channel resource, wherein transmitting the feedback to the network entity on the first control channel resource is based at least in part on using the cell-specific scrambling.

11. The method of claim 1, further comprising determining a subset of a set of control channel resources allocated for transmitting feedback to the network entity based at least in part on a channel metric of the UE, wherein the first control channel resource used to transmit the feedback is in the first subset of the set of control channel resources.

12. The method of claim 11, wherein the channel metric comprises a reference signal received power (RSRP), a received signal strength indicator (RSSI), a beamform angle-of-arrival, a beamform angle-of-departure, a transmit beam, a receive beam, a geographical location, an interference level, a channel state information metric, a throughput level, or any combination thereof.

13. The method of claim 1, further comprising receiving a configuration message mapping control channel resources to subsets of the set of transport blocks, wherein transmitting the feedback comprises transmitting the feedback on the first control channel resource corresponding to the at least one transport block of the first subset of the set of transport blocks that the UE failed to decode.

14. The method of claim 1, wherein determining the first control channel resource associated with the first subset of transport blocks on which to transmit the feedback to the network entity is based at least in part on a quantity of the set of transport blocks in the multicast transmission being less than or equal to a threshold.

15. The method of claim 1, further comprising determining the first control channel resource associated with the first subset of transport blocks on which to transmit the feedback to the network entity based at least in part on a cardinality of the first subset of the set of transport blocks that the UE failed to decode.

16. The method of claim 1, further comprising determining the first control channel resource from candidate control channel resources that are configured for a group of UEs including the UE.

17. The method of claim 1, wherein the feedback comprises acknowledgment or negative acknowledgment feedback.

18. A method for wireless communication at a network entity, comprising:
    transmitting a set of transport blocks in a first multicast transmission, the set of transport blocks comprising a first subset of transport blocks and a second subset of transport blocks, the first subset of transport blocks and the second subset of transport blocks each comprising two or more transport blocks, the set of transport blocks associated with a set of control channel resources, the set of control channel resources comprising a first control channel resource and a second control channel resource, the first subset of transport blocks being associated with the first control channel resource, and the second subset of transport blocks being associated with the second control channel resource
    receiving, from a user equipment (UE) based at least in part on the first multicast transmission, feedback on the first control channel resource associated with the first subset of transport blocks; and
    retransmitting the first subset of the set of transport blocks in a second multicast transmission based at least in part on the first control channel resource associated with the first subset of transport blocks indicates that the UE failed to decode at least one transport block of the first subset of the set of transport blocks.

19. The method of claim 18, further comprising:
    determining a cyclic shift associated with the first control channel resource on which the feedback is received; and
    determining that the cyclic shift corresponds to the first subset of the set of transport blocks.

20. The method of claim 18, further comprising:
    determining a spreading code associated with the first control channel resource on which the feedback is received; and
    determining that the spreading code corresponds to the first subset of the set of transport blocks.

21. The method of claim 18, further comprising:
    determining a frequency location of the first control channel resource on which the feedback is received; and
    determining that the frequency location corresponds to the first subset of the set of transport blocks.

22. The method of claim 18, further comprising:
    determining a time location of the first control channel resource on which the feedback is received; and
    determining that the time location corresponds to the first subset of the set of transport blocks.

23. The method of claim 18, further comprising:
    determining one or more time or frequency resources within the first control channel resource on which the feedback is received; and
    determining that the one or more of the time or frequency resources correspond to the first subset of the set of transport blocks.

24. The method of claim 18, further comprising transmitting a configuration message mapping control channel resources to subsets of the set of transport blocks, wherein receiving the feedback on the first control channel resource is based at least in part on transmitting the configuration message.

25. The method of claim 18, further comprising determining that the first control channel resource associated with the first subset of transport blocks indicates that the UE failed to decode the at least one transport block of the first subset of the set of transport blocks is based at least in part on a quantity of the set of transport blocks in the first multicast transmission being less than or equal to a threshold.

26. The method of claim 18, further comprising determining a cardinality of the first subset of the set of transport blocks that the UE failed to decode based at least in part on the first control channel resource on which the feedback is received.

27. A user equipment (UE), comprising:
a processing system that includes processor circuitry and memory circuitry that stores code, the processing system configured to cause the UE to:
monitor for a set of transport blocks transmitted from a network entity in a multicast transmission, the set of transport blocks comprising a first subset of transport blocks and a second subset of transport blocks, the first subset of transport blocks and the second subset of transport blocks each comprising two or more transport blocks, the set of transport blocks associated with a set of control channel resources, the set of control channel resources comprising a first control channel resource and a second control channel resource, the first subset of transport blocks being associated with the first control channel resource, and the second subset of transport blocks being associated with the second control channel; and
transmit feedback to the network entity on the first control channel resource associated with the first subset of transport blocks, the feedback indicates that the UE failed to decode at least one transport block of the first subset of the set of transport blocks.

28. The UE of claim 27, wherein the first control channel resource indicates that the UE failed to decode the at least one transport block of the first subset of the set of transport blocks.

29. A network entity, comprising:
a processing system that includes processor circuitry and memory circuitry that stores code, the processing system configured to cause the network entity to:
transmit a set of transport blocks in a first multicast transmission, the set of transport blocks comprising a first subset of transport blocks and a second subset of transport blocks, the first subset of transport blocks and the second subset of transport blocks each comprising two or more transport blocks, the set of transport blocks associated with a set of control channel resources, the set of control channel resources comprising a first control channel resource and a second control channel resource, the first subset of transport blocks being associated with the first control channel resource, and the second subset of transport blocks being associated with the second control channel resource
receive, from a user equipment (UE) based at least in part on the first multicast transmission, feedback on the first control channel resource associated with the first subset of transport blocks; and
retransmit the first subset of the set of transport blocks in a second multicast transmission based at least in part on the first control channel resource associated with the first subset of transport blocks indicates that the UE failed to decode at least one transport block of the first subset of the set of transport blocks.

30. The network entity of claim 29, wherein the processing system further configured to cause the network entity to:
determine a cyclic shift associated with the first control channel resource on which the feedback is received; and
determine that the cyclic shift corresponds to the first subset of the set of transport blocks.

* * * * *